United States Patent
Lee

(10) Patent No.: US 11,477,053 B2
(45) Date of Patent: Oct. 18, 2022

(54) METHOD AND APPARATUS FOR ESTIMATING CHANNEL IN WIRELESS COMMUNICATION SYSTEM

(71) Applicant: Samsung Electronics Co., Ltd., Suwon-si (KR)

(72) Inventor: Dongjae Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 17/055,085

(22) PCT Filed: Apr. 3, 2019

(86) PCT No.: PCT/KR2019/003951
§ 371 (c)(1),
(2) Date: Nov. 12, 2020

(87) PCT Pub. No.: WO2019/221388
PCT Pub. Date: Nov. 21, 2019

(65) Prior Publication Data
US 2021/0126815 A1    Apr. 29, 2021

(30) Foreign Application Priority Data

May 14, 2018  (KR) .......... 10-2018-0054800

(51) Int. Cl.
*H04L 25/02*  (2006.01)
*H04J 13/00*  (2011.01)
*H04L 5/00*  (2006.01)

(52) U.S. Cl.
CPC ...... *H04L 25/0224* (2013.01); *H04J 13/0048* (2013.01); *H04L 5/0026* (2013.01); *H04L 25/0212* (2013.01)

(58) Field of Classification Search
CPC ............. H04L 25/0216; H04L 25/0218; H04L 25/022; H04L 23/00; H04L 5/0048;
(Continued)

(56) References Cited

U.S. PATENT DOCUMENTS 9,769,807 B2 *  9/2017  Jöngren ................ H04L 5/0057
10,541,838 B2 *  1/2020  Lee ....................... H04B 7/0413
(Continued)

FOREIGN PATENT DOCUMENTS

EP          2901607 B1     11/2016
KR   10-2007-0111559 A    11/2007
(Continued)

OTHER PUBLICATIONS

Supplementary European Search Report dated May 11, 2021 in connection with European Patent Application No. 19 80 3107, 6 pages.
(Continued)

*Primary Examiner* — Jung Liu

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present invention relates to a method and an apparatus for estimating an uplink channel of a base station in a wireless communication system, comprising the steps of: estimating a position of a wireless channel tap on the basis of a sounding reference signal (SRS) received from a terminal; determining an average power value of the wire-
(Continued)

less channel tap for each link between a transmitting antenna and a receiving antenna from and to which the SRS is transmitted; and estimating an effective channel frequency response (effective CFR) of a physical uplink shared channel (PUSCH) on the basis of the position of the wireless channel tap and the average power value of the wireless channel tap.

15 Claims, 18 Drawing Sheets

(58) Field of Classification Search
CPC ... H04L 5/0023; H04L 5/0035; H04L 5/0007; H04L 27/2636; H04L 27/2646; H04L 27/2666; H04L 27/2698; H04B 7/0478
See application file for complete search history.

(56) References Cited

U.S. PATENT DOCUMENTS

| | | | | |
|---|---|---|---|---|
| 2007/0270154 | A1* | 11/2007 | Kim | H04B 17/309 455/450 |
| 2011/0274187 | A1* | 11/2011 | Huang | H04L 25/0216 375/285 |
| 2012/0307939 | A1* | 12/2012 | Kalyani | H04L 25/0216 375/316 |
| 2015/0341101 | A1* | 11/2015 | Park | H04L 23/00 370/329 |
| 2017/0104611 | A1* | 4/2017 | Lee | H04L 25/0256 |

FOREIGN PATENT DOCUMENTS

| | | |
|---|---|---|
| KR | 10-2009-0053599 A | 5/2009 |
| KR | 10-2018-0119381 A | 11/2018 |

OTHER PUBLICATIONS

International Search Report and Written Opinion of the International Searching Authority in connection with International Application No. PCT/KR2019/003951 dated Jul. 3, 2019, 10 pages.

3GPP TS 36.133 V15.2.0 (Mar. 2018), Technical Specification, 3rd Generation Partnership Project; Technical Specification Group Radio Access Network; Evolved Universal Terrestrial Radio Access (E-UTRA); Requirements for support of radio resource management (Release 15), Mar. 2018, 677 pages.

* cited by examiner

METHOD AND APPARATUS FOR ESTIMATING CHANNEL IN WIRELESS COMMUNICATION SYSTEM

CROSS-REFERENCE TO RELATED APPLICATIONS

This application is a 371 National Stage of International Application No. PCT/KR2019/003951, filed Apr. 3, 2019, which claims priority to Korean Patent Application No. 10-2018-0054800, filed May 14, 2018, the disclosures of which are herein incorporated by reference in their entirety.

BACKGROUND

1. Field

The disclosure relates to a wireless communication system and, more particularly, to a method and an apparatus for estimating a channel using a demodulation reference signal (DMRS) in a wireless communication system.

2. Description of Related Art

In general, a mobile communication system is developed to provide voice services while guaranteeing activity of users. However, the mobile communication system has gradually expanded its service area up to a data service as well as a voice service and has been developed to provide a high speed data service at present. However, since resources are lacking and users demand higher speed services in the mobile communication system providing a current service, a further improved mobile communication system is needed.

To meet the demands, standardization of long term evolution (LTE) is being conducted by the 3rd generation partnership project (3GPP) as one of the next generation mobile communication systems that are being developed. LTE is a technology implementing high speed packet-based communication having a transmission rate of a maximum of 100 Mbps with the goal being to commercialize LTE in 2010. To this end, several methods are being discussed, including a method of reducing the number of nodes located on a communication channel by simplifying network architecture or a method of making wireless protocols the closest to a wireless channel.

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Meanwhile, clusters including a plurality of scatterers or reflectors exist in a wireless channel, and as a result, a receiver receives transmission signals through multiple paths. Since a new radio (NR) DL/UL OFDM symbol has a CP before a net OFDM and thus discards the CP and, when samples corresponding to the size of fast Fourier transform (FFT) are obtained, inter symbol interference (ISI) does not occur. In NR, 14 symbol slots or 12 symbol slots are defined, and a plurality of physical resource blocks (PRBs) exists during 1 slot interval. When a type of a CP is a normal CP, 1 PRB includes 14 OFDM symbols in a time domain and 12 resource elements (REs) in a frequency domain. Accordingly, 1 PRB has 168 REs. When a type of a CP is an extended CP, 1 PRB includes 12 OFDM symbols in a time domain and 12 resource elements (REs) in a frequency domain. Accordingly, 1 PRB has 144 REs. In order to perform coherent demodulation, the BS may have a plurality of transmission antenna ports, and respective antenna ports are disjointly associated with different DMRSs. The NR standard supports 4 DMRS ports in Type 1 and 6 DMRS ports in Type 2 based on a 1-symbol DMRS. The NR standard supports 8 DMRS ports in Type 1 and 12 DMRS ports in Type 2 based on a 2-symbol DMRS. If FFT is performed on N FFT samples in a time domain in which the CP is discarded and taken, a reception in a specific RE to which a DMRS is allocated in a frequency domain may be obtained. As the number of antennas of the BS increases for efficient MIMO transmission, an increase in the number of pilots having the correlation with antenna ports has become a big issue.

SUMMARY

An aspect of the disclosure is to provide a method and an apparatus for estimating a channel to receive a multi-input multi-output (MIMO) signal.

In accordance with an aspect of the disclosure, a method of estimating an uplink channel by a BS in a wireless communication system includes: identifying locations of at least one radio channel taps, based on a sounding reference signal (SRS) received from a UE; determining an average power value of the radio channel taps for each link between a transmission antenna in which the SRS is transmitted and a reception antenna; and estimating an effective channel frequency response (CFR) of a physical uplink shared channel (PUSCH), based on the locations of the radio channel taps and the average power value of the radio channel taps.

In accordance with another aspect of the disclosure, a method of estimating a downlink channel by a UE in a wireless communication system includes: identifying locations of at least one radio channel tap, based on a channel state information reference signal (CSI-RS) received from a BS; determining an average power value of the radio channel taps for each link between a transmission antenna in which the CSI-RS is transmitted and a reception antenna; and estimating an effective channel frequency response (CFR) of a physical downlink shared channel (PDSCH), based on the locations of the radio channel taps and the average power value of the radio channel taps.

In accordance with another aspect of the disclosure, a BS for estimating an uplink channel in a wireless communication system includes: a transceiver configured to transmit and receive a signal; and a controller configured to identify locations of at least one radio channel tap, based on a sounding reference signal (SRS) received from a UE, determine an average power value of the radio channel taps for each link between a transmission antenna in which the SRS is transmitted and a reception antenna, and estimate an effective channel frequency response (CFR) of a physical uplink shared channel (PUSCH), based on the locations of the radio channel taps and the average power value of the radio channel taps.

In accordance with another aspect of the disclosure, a UE for estimating a downlink channel in a wireless communication system includes: a transceiver configured to transmit and receive a signal; and a controller configured to identify locations of at least one radio channel tap, based on a channel state information reference signal (CSI-RS) received from a BS, determine an average power value of the radio channel taps for each link between a transmission antenna in which the CSI-RS is transmitted and a reception antenna, and estimate an effective channel frequency response (CFR) of a physical downlink shared channel (PDSCH), based on the locations of the radio channel taps and the average power value of the radio channel taps.

The disclosure can improve channel estimation performance for receiving a new radio (NR) multi-input multi-output (MIMO) signal. Further, the disclosure can obtain performance of estimating a channel close to an LMMSE channel estimator, which cannot be implemented in fact, using a support of a channel obtained through a channel state information reference signal (CSI-RS) or a sounding reference signal (SRS) and a pattern of code division-multiplexed (CDM) DMRS.

DETAILED DESCRIPTION

Figure 1:
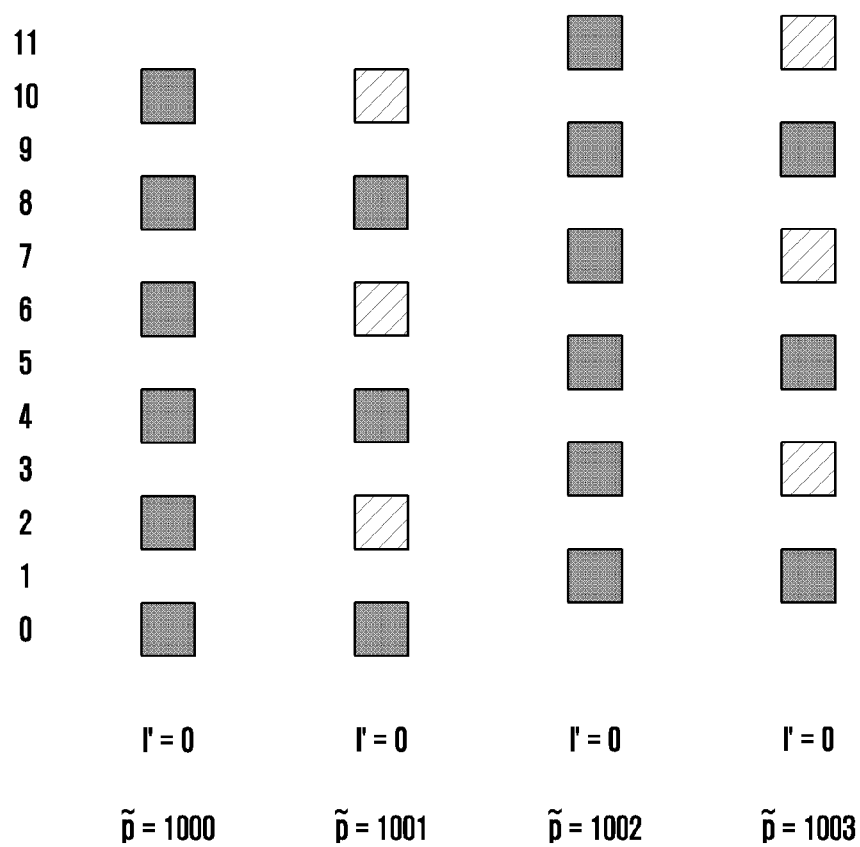
FIG. 1 illustrates frequency locations of REs occupied by 1-symbol DMRSs in Type 1.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

Hereinafter, a method of estimating a reception channel using a DMRS for NR MIMO reception by a UE and a BS in a wireless communication system will be described. In the case of a downlink, the UE may use a location of a radio channel tap estimated using a channel state information-reference signal (CSI-RS). The location of the radio channel tap may indicate a delay level of a signal received in the channel, the number of delays generated through a multipath channel is called sparsity, and a plurality of delay values are supports. The delay of signals may be discontinuous, and there may be a plurality of taps according to the signal delay. Further, the radio channel taps may be sparsely located. In the case of an uplink, the BS may use supports of a channel estimated on the basis of a sounding reference signal (SRS).

When a cyclic prefix-orthogonal frequency division multiplexing (CP-OFDM) is used in NR, the same demodulation reference signal (DMRS) pattern may be used for both a physical downlink shared channel (PDSCH) and a physical uplink shared channel (PUSCH). Particularly, the DMRS may be transmitted in a code division multiplexing (CDM) scheme in time and frequency domains. A DMRS signal corresponding to each layer may be required to estimate a channel for SU-MIMO reception, and the case in which a DMRS code division-multiplexed in the frequency domain is received in a frequency selection channel may need further improved channel estimation algorithm than other cases. The disclosure describes a method of estimating a channel using supports of a channel obtained through a CSI-RS or an SRS and a pattern of a code division-multiplexed DMRS.

The disclosure relates to a method of estimating a reception channel in a wireless communication system, and the method of estimating the reception channel is not limited to the embodiments but may be implemented in various ways.

Figure 2:
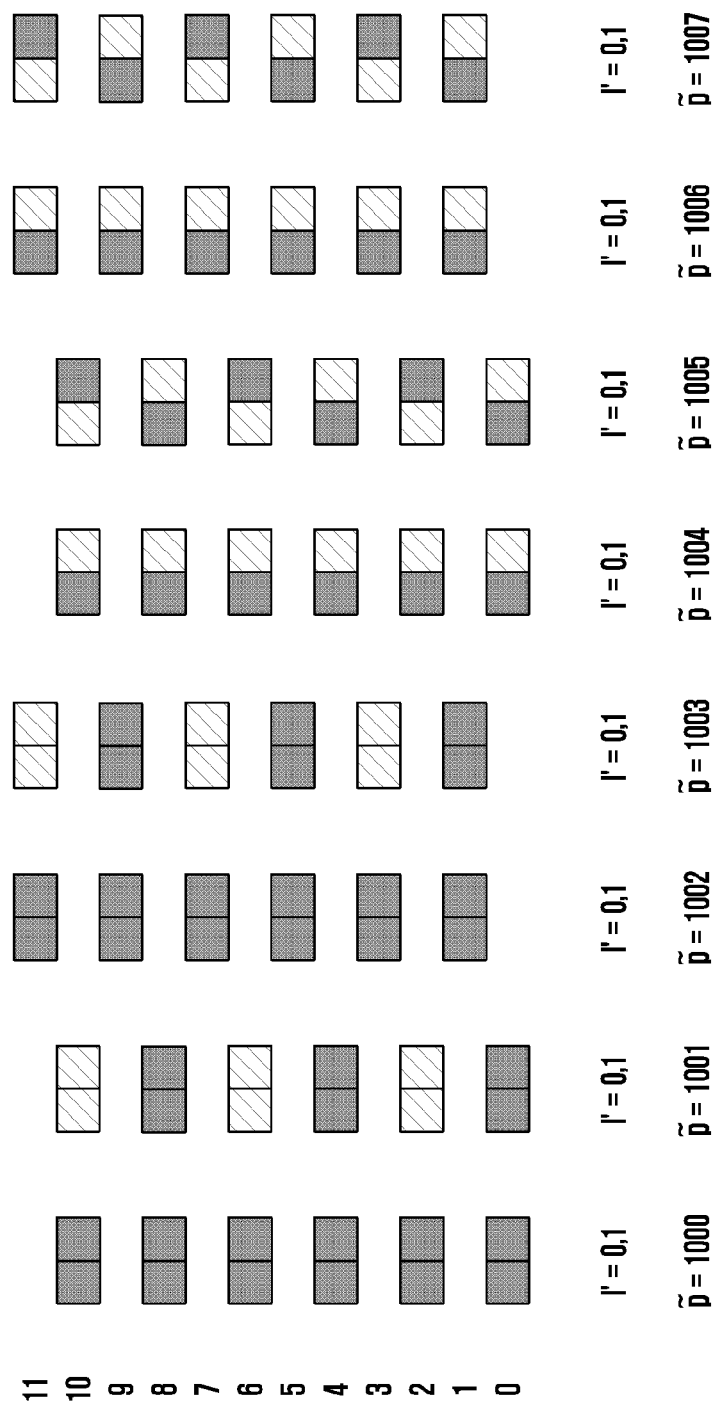
FIG. 2 illustrates frequency locations of REs occupied by 2-symbol DMRSs in Type 1.
Figure 3:
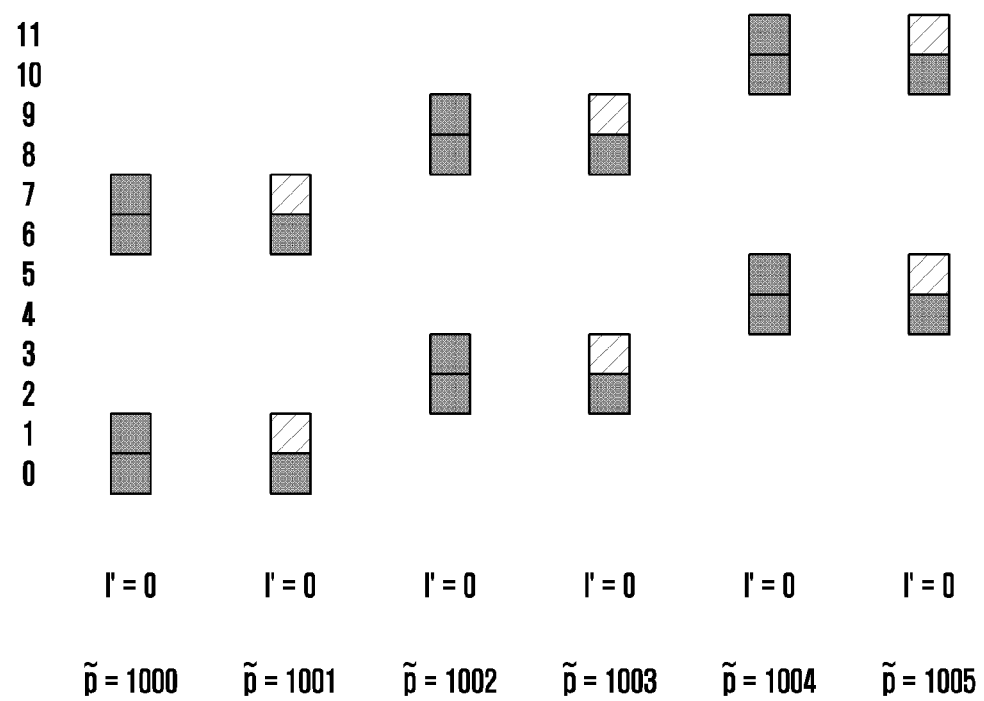
FIG. 3 illustrates frequency locations of REs occupied by 1-symbol DMRSs in Type 2.
Figure 4:
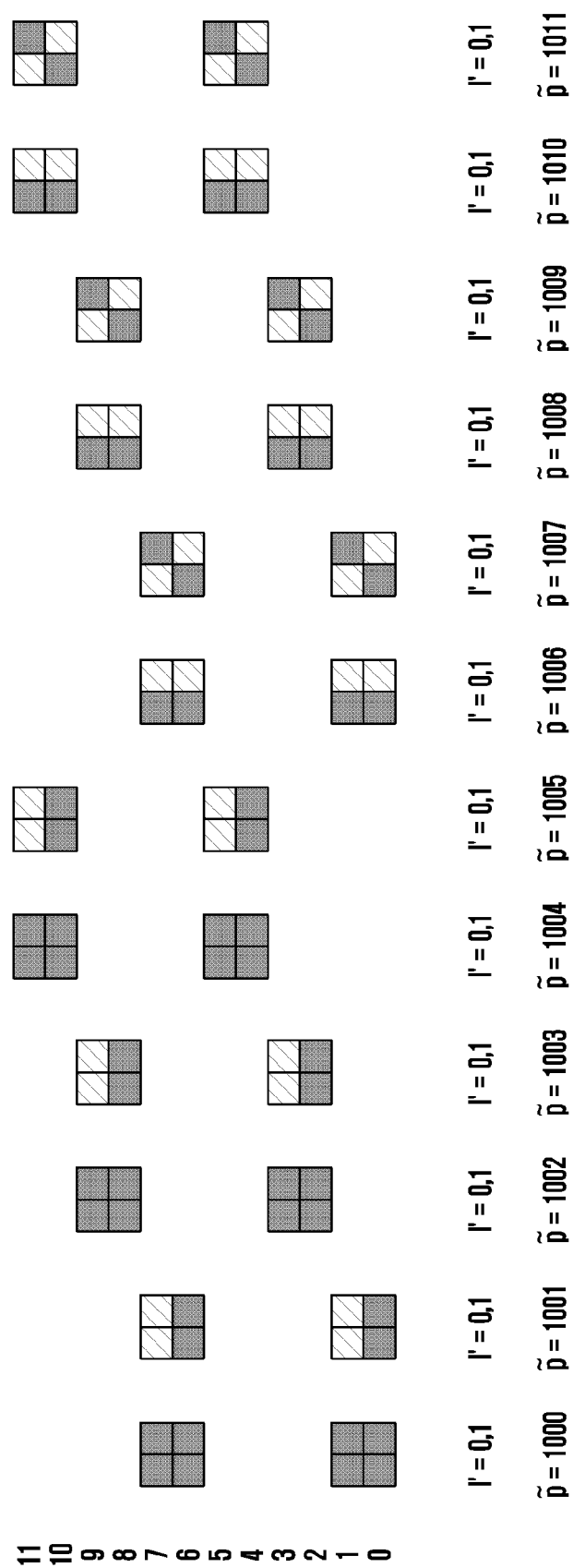
FIG. 4 illustrates frequency locations of REs occupied by 2-symbol DMRSs in Type 2.

FIGS. 1 to 4 illustrate patterns of an NR DMRS according to a type and a symbol. Specifically, FIG. 1 illustrates the frequency location of REs occupied by 1-symbol DMRSs in Type 1, FIG. 2 illustrates the frequency location of REs occupied by 2-symbol DMRSs in Type 1, FIG. 3 illustrates the frequency location of REs occupied 1-symbol DMRSs in Type 2, and FIG. 4 illustrates the frequency location of REs occupied by 2-symbol DMRSs in Type 2.

When a plurality of layers occupies the same physical resource block (PRB), the system is required to have DMRSs having orthogonality in order to estimate a channel of each layer. For convenience, a port number may be defined as p̃-1OOO. In the case of Type 1, four DMRSs having orthogonality may be needed to use four DMRS ports by the BS. The BS may secure orthogonality of two DMRSs by allocating different frequency resources to the two DMRSs. Further, the BS may design DMRSs having the same frequency to have orthogonality through a length-2 orthogonal cover code (OCC) having orthogonality in a frequency domain.

In FIG. 1, ports 0 and 1 may use the length-2 OCC in frequencies 0 and 2, frequencies 4 and 6, and frequencies 8 and 10, and ports 2 and 3 may use the length-2 OCC in frequencies 1 and 3, frequencies 5 and 7, and frequencies 9 and 11. The BS may further use the length-2 OCC in a time domain in order to provide eight DMRS ports having orthogonality in Type 1. In FIG. 2, ports 0 and 4, ports 1 and 5, ports 2 and 6, and ports 3 and 7 may have orthogonality by the length-2 OCC.

In the case of Type 2, six DMRSs having orthogonality may be needed to use six DMRS ports by the BS. The BS may secure orthogonality of three DMRSs by allocating different frequency resources to the three DMRSs. Further, the BS may design DMRSs having the same frequency to have orthogonality through a length-2 orthogonal cover code (OCC) having orthogonality in a frequency domain.

In FIG. 3, ports 0 and 1 may use the length-2 OCC in frequencies 0 and 1 and frequencies 6 and 7, ports 2 and 3 may use the length-2 OCC in frequencies 2 and 3 and frequencies 8 and 9, and ports 4 and 5 may use the length-2 OCC in frequencies 4 and 5 and frequencies 10 and 11. The BS may further use the length-2 OCC in a time domain in order to provide twelve DMRS ports having orthogonality in Type 2. In FIG. 4, ports 0 and 6, ports 1 and 7, ports 2 and 8, ports 3 and 9, ports 4 and 10, and ports 5 and 11 may have orthogonality by the length-2 OCC in a time domain.

Figure 7:
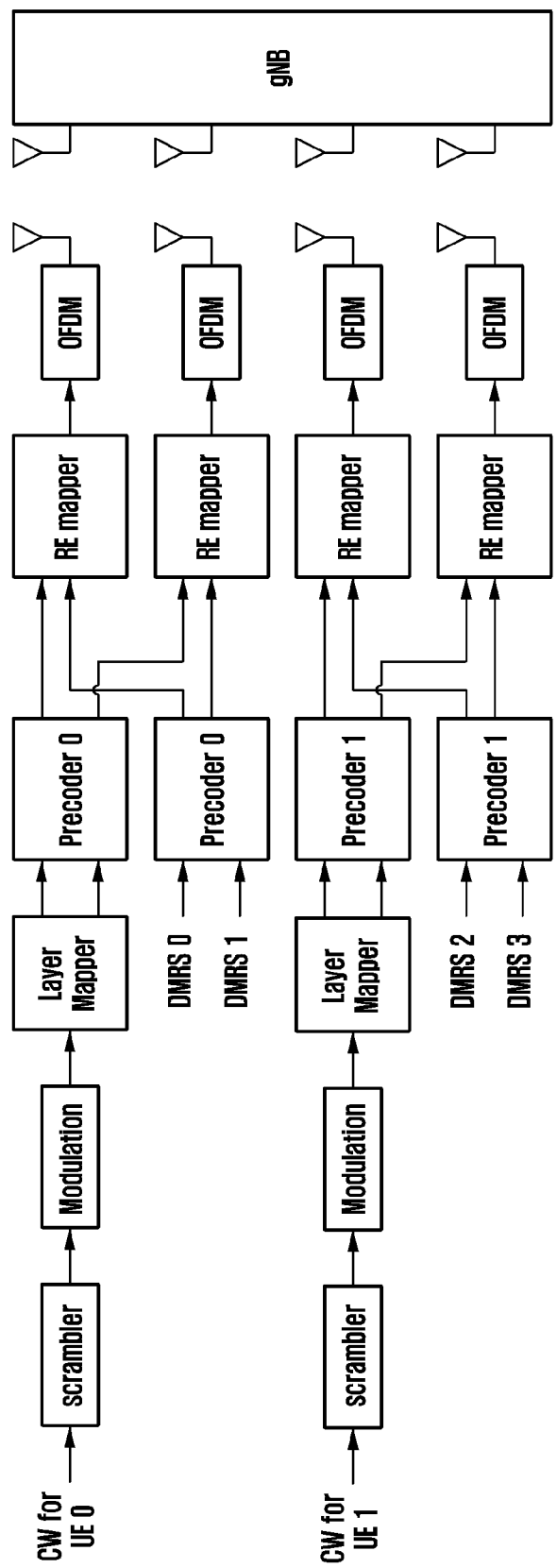
FIG. 7 illustrates a DMRS port structure in UL 2 layer transmission for each UE in UL MU-MIMO.

FIG. 7 illustrates a DMRS port structure in uplink (UL) 2 layer transmission for each user equipment (UE) in multi user-multi input multi output (MU-MIMO). In FIG. 7, it may be noted that the number of transmission antennas of UE 0 is 2 and an MIMO signal of two DMRS ports may be transmitted to a BS (gNB). Further, it may be noted that the number of transmission antennas of UE 1 is 2 and an MIMO signal of two DMRS ports may be transmitted to the BS.

Since a particular PRB is shared between UE 0 and UE 1, a multi-user (MU) MIMO signal is transmitted to the BS, and there is an explicit precoder which the BS knows. The BS allocates DMRS 0 and DMRS 1 to UE 0 and DMRS 2 and DMRS 3 to UE 1. When the BS performs matched filtering on symbols carried on two layers for UE 0 and two layers for UE 1 after performing channel estimation using 4 DMRSs, the BS may use the previously obtained channel estimation value.

The length of a periodic cyclic prefix (CP) may be configured to be longer than the maximum delay length of a multipath which a signal experiences in a radio channel. A maximum (max) delay value of a channel defined as an enhanced pedestrian A (EPA) among various channels which an outdoor pedestrian experiences corresponds to 0.41 us. A max delay value of a channel defined as an enhanced vehicular A (EVA) among various channels which an outdoor vehicle UE experiences is 2.51 us. Further, a max delay value of a channel defined as an enhanced typical urban (ETU) is 5 us. The EPA, EVA, and ETU are channels including 7, 9, and 9 multiple paths. That is, max delays of most radio channels may be within the OFDM CP length, and channel taps may be sparsely generated. Channels which an actual reception signal experiences may be generated by a combination of a transmission filter of the BS, a sparse radio channel, and a reception filter. Hereinafter, a channel which does not vary over the time during 14-symbol 1 slot is assumed.

When a transmitter uses ports 0 and 1 for 1-symbol DMRSs configured as Type 1, the DMRSs on subcarriers 0, 2, 4, 6, 8, and 10 experience the same channel within 1 PRB u. On the subcarriers, an effective channel frequency response (CFR) between transmission layer 0 and reception antenna port m may be defined as $g_{m,0}^{(u)}=[g_{m,0}^{(u)}(0)\ g_{m,0}^{(u)}(2)\ \ldots\ g_{m,0}^{(u)}(10)]^T$, and an effective CFR between transmission layer 1 and reception antenna port m may be defined as $g_{m,1}^{(u)}=[g_{m,1}^{(u)}(0)\ g_{m,1}^{(u)}(2)\ \ldots\ g_{m,1}^{(u)}(10)]^T$. At this time, a signal vector obtained by dividing a reception signal vector on the subcarrier obtained from reception antenna m by a reference signal may be defined as $y_m^{(u)}=[y_m^{(u)}(0)\ y_m^{(u)}(2)\ \ldots\ y_m^{(u)}(10)]^T$, and a noise vector obtained by dividing a noise signal by the reference signal may be defined as $w_m^{(u)}=[w_m^{(u)}(0)\ w_m^{(u)}(2)\ \ldots\ w_m^{(u)}(10)]^T$. The vector $y_m^{(u)}$ is expressed as shown in [Equation 1].

$$y_m^{(u)} = [O_0\ O_1]\begin{bmatrix} g_{m,0}^{(u)} \\ g_{m,1}^{(u)} \end{bmatrix} + w_m^{(u)} \quad \text{[Equation 1]}$$

Here, $$O_0 = \begin{bmatrix} 1 & & & & & \\ & 1 & & & & \\ & & 1 & & & \\ & & & 1 & & \\ & & & & 1 & \\ & & & & & 1 \end{bmatrix} \quad \text{[Equation 2]}$$

$$\text{and } O_1 = \begin{bmatrix} 1 & & & & & \\ & -1 & & & & \\ & & 1 & & & \\ & & & -1 & & \\ & & & & 1 & \\ & & & & & -1 \end{bmatrix}.$$

The OCC is the same in the same of PRBs, and thus an index u may be omitted. When the effective CFR $g_{m,n}^{(u)}$ is expressed again through an effective channel impulse response (CIR) $\gamma_{m,n}$, [Equation 1] above may be expressed by [Equation 3] below.

$$y_m^{(u)} = [O_0 F^{(u)}\ O_1 F^{(u)}]\begin{bmatrix} \gamma_{m,0} \\ \gamma_{m,1} \end{bmatrix} + w_m^{(u)} \quad \text{[Equation 3]}$$

The effective CIR vector $\gamma_{m,n}=[\gamma_{m,n}(0)\ \gamma_{m,n}(1)\ \ldots\ \gamma_{m,n}(L-1)]^T$ is a column vector having only a non-zero entry of an effective channel impulse response (CIR) between transmission layer n and reception antenna port m. A plurality of reception antenna ports is co-located, and thus a support of a channel may be maintained regardless of a reception antenna port index. At this time, each of sparsity of the CIR between transmission layers 0 and 1 and reception antenna port m may be defined as L. When the FFT size is N, a matrix $F^{(u)}$ is a submatrix having the size of 6×L including a row vector corresponding to physical RE indexes at which DMRS ports 0 and 1 of PRB u are located and a column vector at channel tap locations of L channel coefficient values in an N×N Fourier matrix.

When a reception signal and a noise signal in $N_{PRB}$ RPBs are defined as $$y_m = \left[\left(y_m^{(u_0)}\right)^T\ \ldots\ \left(y_m^{(u_{N_{PRB}-1})}\right)^T\right]^T \text{ and } w_m = \left[\left(w_m^{(u_0)}\right)^T\ \ldots\ \left(w_m^{(u_{N_{PRB}-1})}\right)^T\right]^T,$$

respectively, [Equation 3] above may be expressed as [Equation 4] below.

$$y_m = [(I_{N_{PRB}} \otimes O_0)F\ (I_{N_{PRB}} \otimes O_1)F]\begin{bmatrix} \gamma_{m,0} \\ \gamma_{m,1} \end{bmatrix} + w_m \quad \text{[Equation 4]}$$

$\otimes$ is a Kronecker product, $I_{N_{PRB}}$ is a $N_{PRB} \times N_{PRB}$ identity matrix, and F may be defined as [Equation 5] below.

$$F = \begin{bmatrix} F^{(u_0)} \\ \vdots \\ F^{(u_{N_{PRB}-1})} \end{bmatrix} \in \mathbb{C}^{6N_{PRB} \times L} \qquad \text{[Equation 5]}$$

Since the effective CIR $\gamma_{m,n}(l)$ is a precoded version of the CIR $\theta_{m,n}(l)$, if a coefficient of a precoder for layer n and tx antenna n' is defined as $p_{n',n}$, the following equation is established.

$$\gamma_{m,0}(l) = p_{0,0}\eta_{m,0}(l) + p_{1,0}\eta_{m,1}(l) \qquad \text{[Equation 6]}$$

$$\gamma_{m,1}(l) = p_{0,1}\eta_{m,0}(l) \pm p_{1,1}\eta_{m,1}(l) \qquad \text{[Equation 7]}$$

[Equation 6] and [Equation 7] are expressed as shown below.

$$\begin{bmatrix} \gamma_{m,0}(l) \\ \gamma_{m,1}(l) \end{bmatrix} = \begin{bmatrix} p_{0,0} & p_{0,1} \\ p_{0,1} & p_{1,1} \end{bmatrix} \begin{bmatrix} \eta_{m,0}(l) \\ \eta_{m,1}(l) \end{bmatrix} \qquad \text{[Equation 8]}$$

A CIR vector is $\eta_{m,n} = [\eta_{m,n}(0) \; \eta_{m,n}(1) \; \ldots \; \eta_{m,n}(L-1)]^T$, and a CIR vector and an effective CIR vector stacked for a specific reception antenna with different transmission layer indexes are defined below.

$$\eta_m = [(\eta_{m,0})^T (\eta_{m,1})^T]^T \in \mathbb{C}^{2L \times 1} \qquad \text{[Equation 9]}$$

$$\gamma_m = [(\gamma_{m,0})^T (\gamma_{m,1})^T]^T \in \mathbb{C}^{2L \times 1} \qquad \text{[Equation 10]}$$

The following equation may be obtained using [Equation 8], [Equation 9], and $$\gamma_m = (P^T \otimes I_L)\eta_m \qquad \text{[Equation 11]}$$

The precoder matrix, $$P = \begin{bmatrix} p_{0,0} & p_{0,1} \\ p_{1,0} & p_{1,1} \end{bmatrix} \qquad \text{[Equation 12]}$$

If [Equation 11] is substituted for [Equation 4], $$y_m = \Phi(P^T \otimes I_L)\eta_m + w_m \text{ is made,} \qquad \text{[Equation 13]}$$

and $\Phi$ is defined as shown below.

$$\Phi = [(I_{N_{PRB}} \otimes O_0)F(I_{N_{PRB}} \otimes O_1)F] \in \mathbb{C}^{6N_{PRB} \times 2L} \qquad \text{[Equation 14]}$$

LMMSE estimate of the CIR is expressed as shown below.

$$\hat{\eta}_m = ((P^T \otimes I_L)^H \Phi^H \Phi (P^T \otimes I_L) + \sigma_w^2 C_{\eta_m}^{-1})^{-1} (P^T \otimes I_L)^H \Phi^H y_m \qquad \text{[Equation 15]}$$

In [Equation 15], $C_{\eta_m}$ is a covariance matrix of $\eta_m$, and [Equation 16] is made using $O_0$ that is an identity matrix.

$$\Phi^H \Phi = \begin{bmatrix} F^H F & F^H(I_{N_{PRB}} \otimes O_1)F \\ F^H(I_{N_{PRB}} \otimes O_1)F & F^H F \end{bmatrix} \qquad \text{[Equation 16]}$$

When $C_{\eta_m}$ is determined, the correlation between $\eta_{m,0}$ and $\eta_{m,1}$ which are entries of $\eta_m$, that is, the transmit antenna correlation should be considered. If a channel coefficient is not located at a tap in an accurate sample space, a covariance matrix may be determined in consideration of a leakage matrix by a transmission/reception filter. In an N×N Fourier matrix, a submatrix $\Psi^{(u)}$ having the size of 12×L including a row vector corresponding to physical RE indexes of REs at which data of PRB u is located and a column vector at channel tap locations at which L channel coefficient values are located may be defined. If an effective CFR vector of the RE in transmission layer n on PRB u carrying a shared channel and reception antenna m is defined as $f_{m,n}^{(u)} = [g_{m,n}^{(u)}(0) \; g_{m,n}^{(u)}(1) \ldots g_{m,n}^{(u)}(11)]^T$, an LMMSE estimate of $f_m^{(u)} = [(f_{m,0}^{(u)})^T \; (f_{m,1}^{(u)})^T]^T$ is as shown below.

$$\hat{f}_m^{(u)} = [\Psi^{(u)} \; \Psi^{(u)}](P^T \otimes I_L)\hat{\eta}_m \qquad \text{[Equation 17]}$$

If only one of DMRS transmission antenna port 0 and DMRS transmission antenna port 1 is activated, an LMMSE channel estimate of an effective CFR vector $f_{m,n}^{(u)}$ of reception antenna m on RB u may be expressed as shown below.

$$\hat{f}_{m,0}^{(u)} = \Psi^{(u)}(F^H F + \sigma_w^2 C_{\gamma_{m,0}}^{-1})^{-1} F^H (I_{N_{PRB}} \otimes O_0) y_m \qquad \text{[Equation 18]}$$

$$\hat{f}_{m,1}^{(u)} = \Psi^{(u)}(F^H F + \sigma_w^2 C_{\gamma_{m,1}}^{-1})^{-1} F^H (I_{N_{PRB}} \otimes O_1) y_m \qquad \text{[Equation 19]}$$

In [Equation 18] and [Equation 19], $C_{\gamma_{m,0}}$ and $C_{\gamma_{m,1}}$ are covariance matrixes of effective CIR vector $\gamma_{m,0}$ and $\gamma_{m,1}$.

When a transmitter uses ports 2 and 3 for 1-symbol DMRSs configured as Type 1, the DMRSs on subcarriers 1, 3, 5, 7, 9, and 11 experience the same channel within 1 PRB u. On the subcarriers, an effective CFR between transmission layer 0 and reception antenna port m may be defined as $g_{m,0}^{(u)} = [g_{m,0}^{(u)}(1) \; g_{m,0}^{(u)}(3) \ldots g_{m,0}^{(u)}(11)]^T$, and an effective CFR between transmission layer 1 and reception antenna port m may be defined as $g_{m,1}^{(u)} = [g_{m,1}^{(u)}(1) \; g_{m,1}^{(u)}(3) \ldots g_{m,1}^{(u)}(11)]^T$. At this time, a signal vector obtained by dividing a reception signal vector on the subcarrier obtained from reception antenna m by a reference signal may be defined as $y_m^{(u)} = [y_m^{(u)}(1) \; y_m^{(u)}(3) \ldots y_m^{(u)}(11)]^T$, and a noise vector obtained by dividing a noise signal by the reference signal may be defined as $w_m^{(u)} = [w_m^{(u)}(1) \; w_m^{(u)}(3) \ldots w_m^{(u)}(11)]^T$. The vector $y_m^{(u)}$ is expressed as shown below.

$$y_m^{(u)} = [O_0 \; O_1] \begin{bmatrix} g_{m,0}^{(u)} \\ g_{m,1}^{(u)} \end{bmatrix} + w_m^{(u)} \qquad \text{[Equation 20]}$$

If the effective CFR $g_{m,n}^{(u)}$ is expressed again using the effective CIR $\gamma_{m,n}$, [Equation 20] above may be expressed as shown below.

$$y_m^{(u)} = [O_0 F^{(u)} \; O_1 F^{(u)}] \begin{bmatrix} \gamma_{m,0} \\ \gamma_{m,1} \end{bmatrix} + w_m^{(u)} \qquad \text{[Equation 21]}$$

When the FFT size is N, a matrix $F^{(u)}$ is a submatrix having the size of 6×L including a row vector corresponding to physical RE indexes of REs at which DMRS ports 2 and 3 of PRB u are located and a column vector at channel tap locations of L channel coefficient values in an N×N Fourier matrix, and F may be defined as shown in [Table 22] below.

$$F = \begin{bmatrix} F^{(u_c)} \\ \vdots \\ F^{(u_{N_{PRB}-1})} \end{bmatrix} \in \mathbb{C}^{6N_{PRB} \times L} \qquad \text{[Equation 22]}$$

Through a development similar to that from [Equation 4] to [Equation 16] above, an LMMSE estimate of an effective CFR vector $f_m^{(u)}=[(f_{m,2}^{(u)})^T (f_{m,3}^{(u)})^T]^T$ of reception antenna m on PRB u is as shown below.

$$\hat{f}_m^{(u)}[\Psi^{(u)}{}_{\Psi^{(u)}}](P^T \otimes I_L)\hat{\eta}_m \qquad \text{[Equation 23]}$$

In [Equation 23], a CIR vector estimate $\hat{\eta}_m$ is as shown below.

$$\hat{\eta}_m = ((P^T \otimes I_L)^H \Phi^H \Phi (P^T \otimes I_L) + \sigma_w^2 C_{\eta_m}^{-1})^{-1} (P^T \otimes I_L)^H \Phi^H y_m \qquad \text{[Equation 24]}$$

In the case of a 1-symbol DMRS, Type 1 provides a maximum of four DMRS ports. In the case of a 1-symbol DMRS, Type 2 provides a maximum of six DMRS ports. In order to provide relatively more DMRSs, spacing between subcarriers of the DMRS more increases than spacing of Type 1, and thus larger deterioration of channel estimation performance may be expected than Type 1 in a frequency selection channel.

When a transmitter uses ports 0 and 1 for 1-symbol DMRSs configured as Type 2, the DMRSs on subcarriers 0, 1, 6, and 7 experience the same channel within 1 PRB u. An effective CFR between transmission layers 0 and 1 on PRB u carrying a shared channel and reception antenna port m may be obtained through a similar method from the equation development from [Equation 1] to [Equation 19].

When a transmitter uses ports 2 and 3 for 1-symbol DMRSs configured as Type 2, the DMRSs on subcarriers 2, 3, 8, and 9 experience the same channel within 1 PRB u. An effective CFR between transmission layers 2 and 3 on PRB u carrying a shared channel and reception antenna port m may be obtained through a similar method from [Equation 1] to [Equation 19].

When a transmitter uses ports 4 and 5 for 1-symbol DMRSs configured as Type 2, the DMRSs on subcarriers 4, 5, 10, and 11 experience the same channel within 1 PRB u. An effective CFR between transmission layers 4 and 5 on PRB u carrying a shared channel and reception antenna port m may be obtained through a similar method from the equation development from [Equation 1] to [Equation 19].

When the channel estimation is performed using the 2-symbol DMRS illustrated in FIG. 2 (type 1) and FIG. 4 (type 2), the above-mentioned channel estimation scheme may be applied after length-2 De-Walsh in a time domain.

Meanwhile, the scheme for estimating the LMMSE channel may have the following problem. As noted from [Equation 3], [Equation 15], [Equation 18], [Equation 19], [Equation 21], and [Equation 24], the scheme for estimating the LMMSE channel may be applied only when sparsity of radio channels and autocorrelation matrixes $C_{\eta_m}$ and $C_{y_{m,n}}$ of the radio channels are known. However, it is impossible for the UE to obtain the accurate statistical value, a sub-optimal channel estimator is needed.

The disclosure proposes a channel estimation scheme after DMRSs are allocated to the UE. In order to obtain sparsity of DL/UL channels, pilot signals uniformly spread to a system band (bandwidth part) viewed from the UE are required. In order to precisely estimate a channel between the UE and the BS in NR, the BS may use a sounding reference signal (SRS) in the UL and the UE may use a channel state information-reference signal (CSI-RS) in the DL.

Since channel sparsity is an amount of a slow change over the time, the channel sparsity may be approximately obtained as the BS periodically or aperiodically receives the SRS from the UE in the UL and the UE receives the CSI-RS from the BS in the DL. In the UL, a plurality of UEs are required to share and use UL resources for the SRS, and thus UL capacity may decrease due to SRS reception. In the DL, a plurality of UEs may use the same resources for the CSI-RS, and thus a decrease in DL capacity may be relatively smaller than the SRS.

The BS estimating UL channel sparsity and channel power through the SRS may receive assistance from the DMRS for one scheduled PRB to estimate the channel in the UL, and the UE estimating DL channel sparsity and channel power through the CSI-RS may receive assistance from the DMRS to estimate the channel for the scheduled PRB in the DL. The disclosure proposes a channel estimator close to performance of the LMMSE channel estimator which cannot be implemented in fact through the above scheme.

Figure 5:
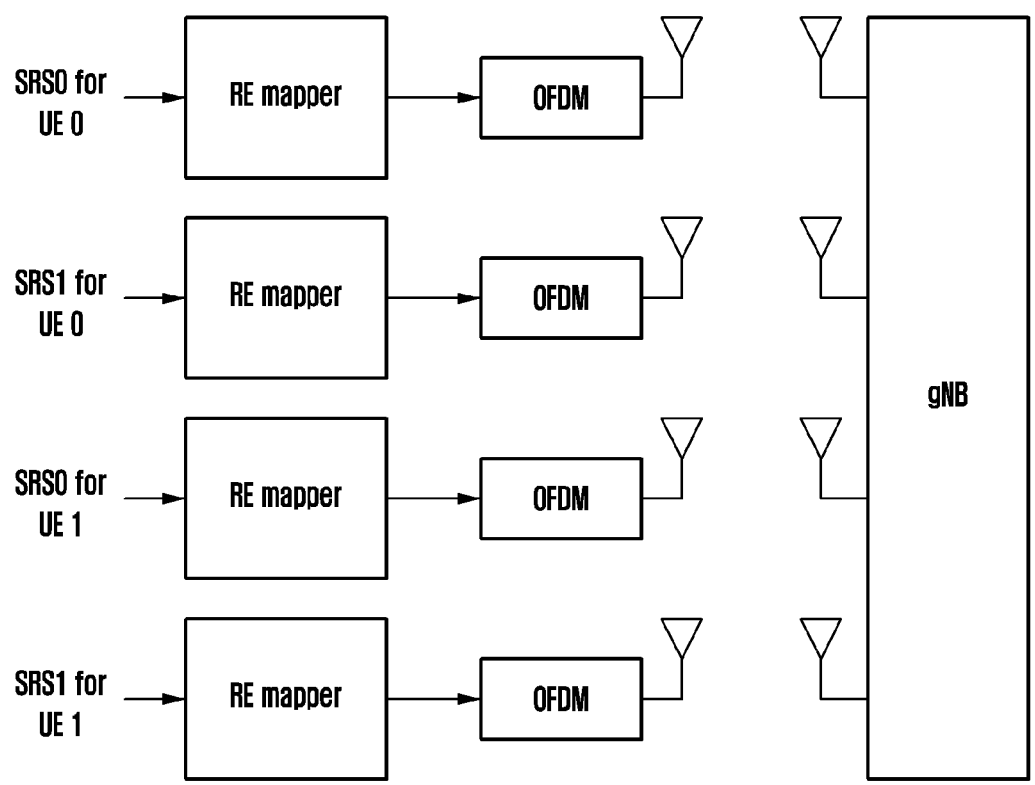
FIG. 5 illustrates an antenna port structure in UL 2 layer transmission for each UE in MU-MIMO.
Figure 6:
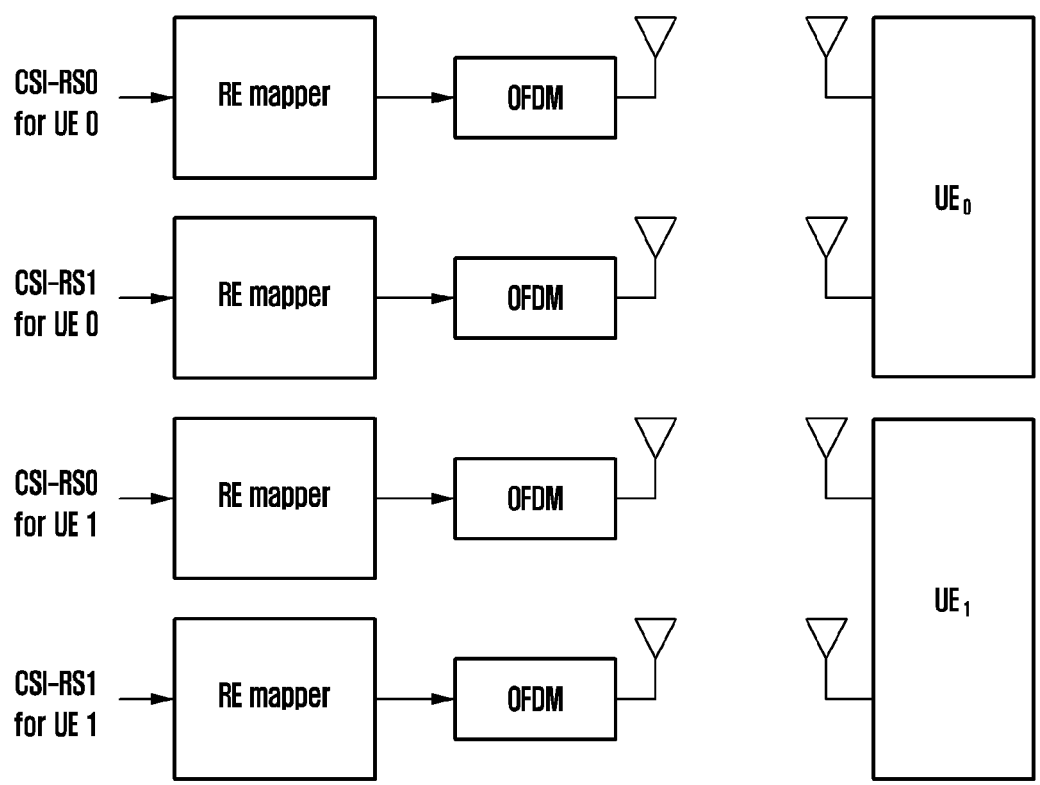
FIG. 6 illustrates an antenna port structure in DL 2 layer transmission for each UE in MU-MIMO.

FIG. 5 illustrates an antenna port structure for an SRS in UL 2 layer transmission for each UE in MU-MIMO, and FIG. 6 illustrates an antenna port structure for a CSI-RS in DL 2 layer transmission for each UE in MU-MIMO.

In FIG. 5, SRSs of UE 0 may be mapped to REs through an RE mapper and may be transmitted to the BS through two antenna ports allocated to UE 0. Similarly, SRSs of UE 1 may be transmitted to the BS through two antenna ports.

In FIG. 6, CSI-RSs of UE 0 may be mapped to REs through an RE mapper and may be transmitted to UE 0 by the BS through two antenna ports allocated to UE 0. Similarly, CSI-RSs of UE 1 may be transmitted to UE 1 by the BS through two antenna ports.

Figure 8:
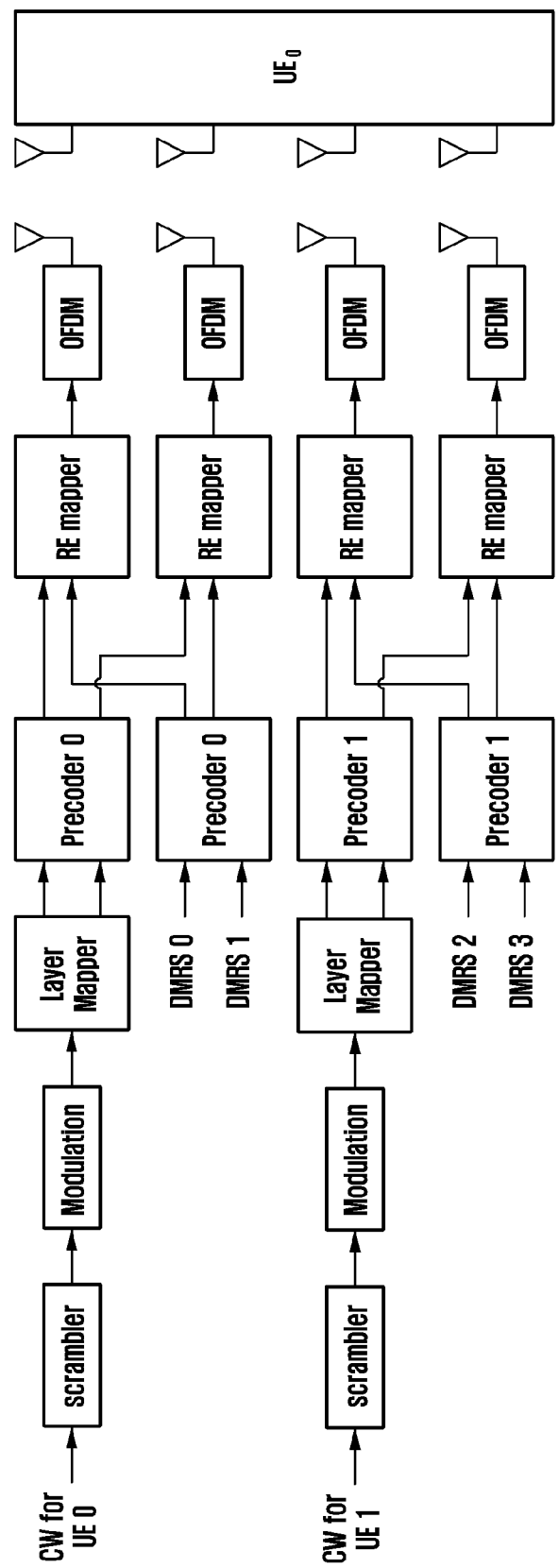
FIG. 8 illustrates a DMRS port structure in DL 2 layer transmission for each UE in DL MU-MIMO.

FIG. 7 illustrates a DMRS port structure in UL 2 layer transmission for each UE in UL MU-MIMO, and FIG. 8 illustrates a DMRS port structure in DL 2 layer transmission for each UE in DL MU-MIMO.

In FIG. 7, it may be assumed that DMRSs 0 and 1 are allocated to UE 0 and DMRSs 2 and 3 are allocated to UE 1. The DMRSs allocated to the UEs may be precoded and mapped to REs through an RE mapper. DMRSs 0 and 1 may be transmitted to the BS through DMRS ports 0 and 1 allocated to UE 0. DMRSs 2 and 3 may be transmitted to the BS through DMRS ports 2 and 3 allocated to UE 1.

In FIG. 8, it may be assumed that the BS allocates DMRSs 0 and 1 to UE 0 and DMRSs 2 and 3 to UE 1. Like in FIG. 7, the DMRSs allocated to the UEs may be precoded and mapped to REs through an RE mapper in the downlink, DMRSs 0 and 1 may be transmitted to UE 0 through DMRS ports 0 and 1 allocated to UE 0. DMRSs 2 and 3 may be transmitted to UE 1 through DMRS ports 2 and 3 allocated to UE 1.

In the disclosure, it may be assumed that sparsity of the channel and power of the channel are estimated from the SRS which the UE transmits to the BS in the UL as shown in FIG. 5 and from the CSI-RS which the BS transmits to the UE in the DL as shown in FIG. 6 in order to estimate the effective CFR. In FIG. 5, the BS estimates the channel by receiving SRSs transmitted from UE 0 and UE 1 in the UL. At this time, the SRSs may be FDM-transmitted and CDM-transmitted in a system bandwidth (bandwidth part) viewed from the UE and may be distinguished between UEs. In FIG. 6, the UE may estimate the channel by receiving the CSI-RS transmitted from the BS in the DL. At this time, the CSI-RS may be FDM-transmitted and CDM-transmitted in a system bandwidth (bandwidth part) viewed from the UE and may be distinguished between UEs.

In FIG. 7, when the BS lets UEs transmit a PUSCH through a PDCCH, a plurality of UEs may transmit the PUSCH on PRBs. For channel estimation, the BS may allocate different DMRS ports to UE 0 and UE 1, and each DMRS signal passes through a precoder which is the same as a layer of the PUSCH corresponding thereto, and the thus effective CFRs of the DMRSs may be the same.

In FIG. 8, when the BS lets UEs transmit a PDSCH through a PDCCH, a plurality of UEs may receive the PDSCH on PRBs. For channel estimation, the BS may allocate different DMRS ports to UE 0 and UE 1, and each DMRS signal passes through a precoder which is the same as a layer of the PUSCH corresponding thereto, and the thus effective CFRs of the DMRSs may be the same.

Figure 9:
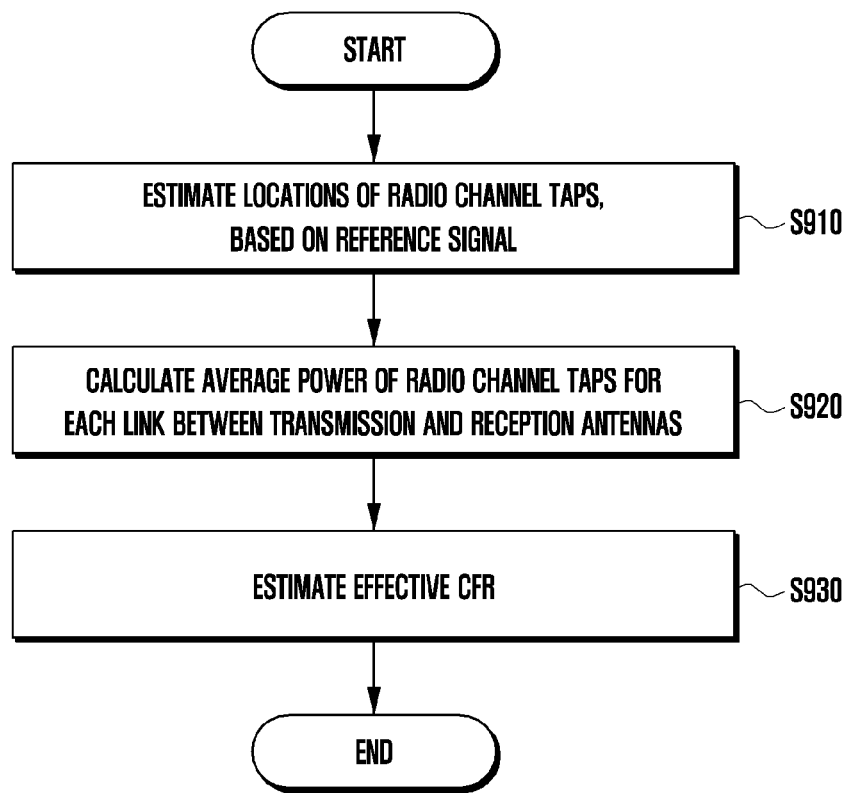
FIG. 9 is a flowchart illustrating a method of estimating a channel according to an embodiment of the disclosure.

FIG. 9 is a flowchart illustrating a method of estimating a channel according to an embodiment of the disclosure. The BS may estimate an uplink channel by receiving a reference signal from the UE, and the UE may estimate a downlink channel by receiving a reference signal from the BS. A method of estimating the uplink channel and a method of estimating the downlink channel may have different entities and different reference signals for channel estimation but the method of estimating channels may correspond to each other. Hereinafter, the method of estimating the uplink channel by the BS is first described and then the method of estimating the downlink channel by the UE is described. First, in step S910, the BS may identify locations of at least one radio channel taps on the basis of sounding reference signal (SRS) received from the UE. The UE may identify locations of at least one radio channel taps on the basis of a channel state information reference signal (CSI-RS) received from the BS.

The location of the radio channel tap may indicate a delay level of a signal received in the channel, the number of delays generated through a multipath channel is called sparsity, and a plurality of delay values are supports. The delay of signals may be discontinuous, and there may be a plurality of taps according to the signal delay. Further, the radio channel taps may be sparsely located. The BS or the UE may estimate the support on the basis of the received reference signal.

In step S920, the BS may determine an average power value of the radio channel taps for each link between a transmission antenna in which the SRS is transmitted and a reception antenna. The UE may determine an average channel tap power value for each link between a transmission antenna and a reception antenna in which the CSI-RS is transmitted. The average channel tap power may be determined on the assumption that the average channel tap power is uniformly allocated to each link between transmission and reception antennas.

In step S930, the BS may estimate an effective channel frequency response (CFR) of a physical uplink shared channel (PUSCH) on the basis of the locations of the radio channel taps and the average power value of the radio channel taps. The UE may estimate an effective channel frequency response (CFR) of a physical downlink shared channel (PDSCH) on the basis of the locations of the radio channel taps and the average power value of the radio channel taps. A method of estimating the effective CFR may be described below in detail with reference to FIGS. 10, 11, and 12.

As described in FIG. 9, the method of estimating the uplink channel and the method of estimating the downlink channel may have different entities for estimating channels and received reference signals, but the methods of estimating the channels may correspond to each other. The following description will be made on the basis of the assumption of the method of estimating the uplink channel by the BS. The method of estimating the uplink channel described with reference to FIGS. 10, 11, and 12 below may be applied to the method of estimating the downlink channel by the UE.

Figure 10:
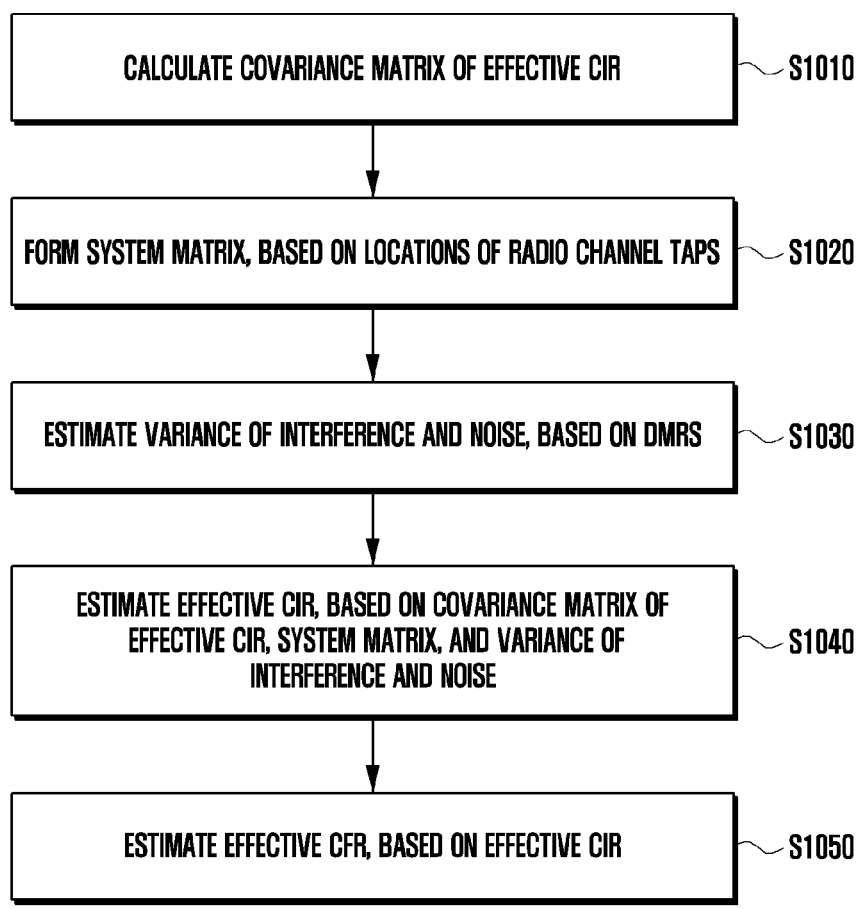
FIG. 10 is a flowchart illustrating a method of estimating an effective CFR according to an embodiment of the disclosure.

FIG. 10 is a flowchart illustrating a method of estimating an effective CFR according to an embodiment of the disclosure.

In step S1010, the BS may determine a covariance matrix of an effective channel impulse response (CIR). The BS may determine the covariance matrix of the CIR on the basis of the assumption that channel power between a plurality of transmission antennas and reception antennas is uniformly allocated to each channel tap on the basis of the average power value of the radio channel taps in step S920 of FIG. 9. The BS may determine the covariance matrix of the effective CIR using a precoder.

In step S1020, the BS may determine a system matrix on the basis of the locations of the radio channel taps. The locations of the radio channel taps may be estimated in step S910 of FIG. 9, and the effective CFR may be expressed as a product of the system matrix and the effective CIR.

In step S1030, the BS may estimate a variance of interference and noise on the basis of a demodulation reference signal (DMRS) received from the UE.

In step S1040, the BS may estimate the effective CIR on the basis of the covariance matrix of the effective CIR, the system matrix, and the variance of interference and noise.

In step S1050, the BS may estimate the effective CFR on the basis of the effective CIR. The BS may perform fast Fourier transform (FFT) on the effective CIR in a frequency domain and estimate the effective CFR of resource elements carrying the PUSCH.

A method of estimating the channel using the DMRS according to an embodiment of the disclosure is described below. When the BS estimates the uplink channel using the DMRS received from the UE, the UE may first OCC-decover the DMRS with an orthogonal cover code (OCC) which is code division-multiplexed in a frequency direction (F-CDM) and estimate the channel for each link between one transmission layer and one reception antenna. The BS may jointly estimate the channel for links between a plurality of transmission layers and reception antennas rather than separately estimating the channel for each link between one transmission layer and one reception antenna.

The following embodiment is described on the basis of the assumption of the 1-symbol DMRS pattern and Type 1 of FIG. 1. Further, the embodiment of the disclosure may be applied to the case of FIGS. 2, 3, and 4.

Figure 11:
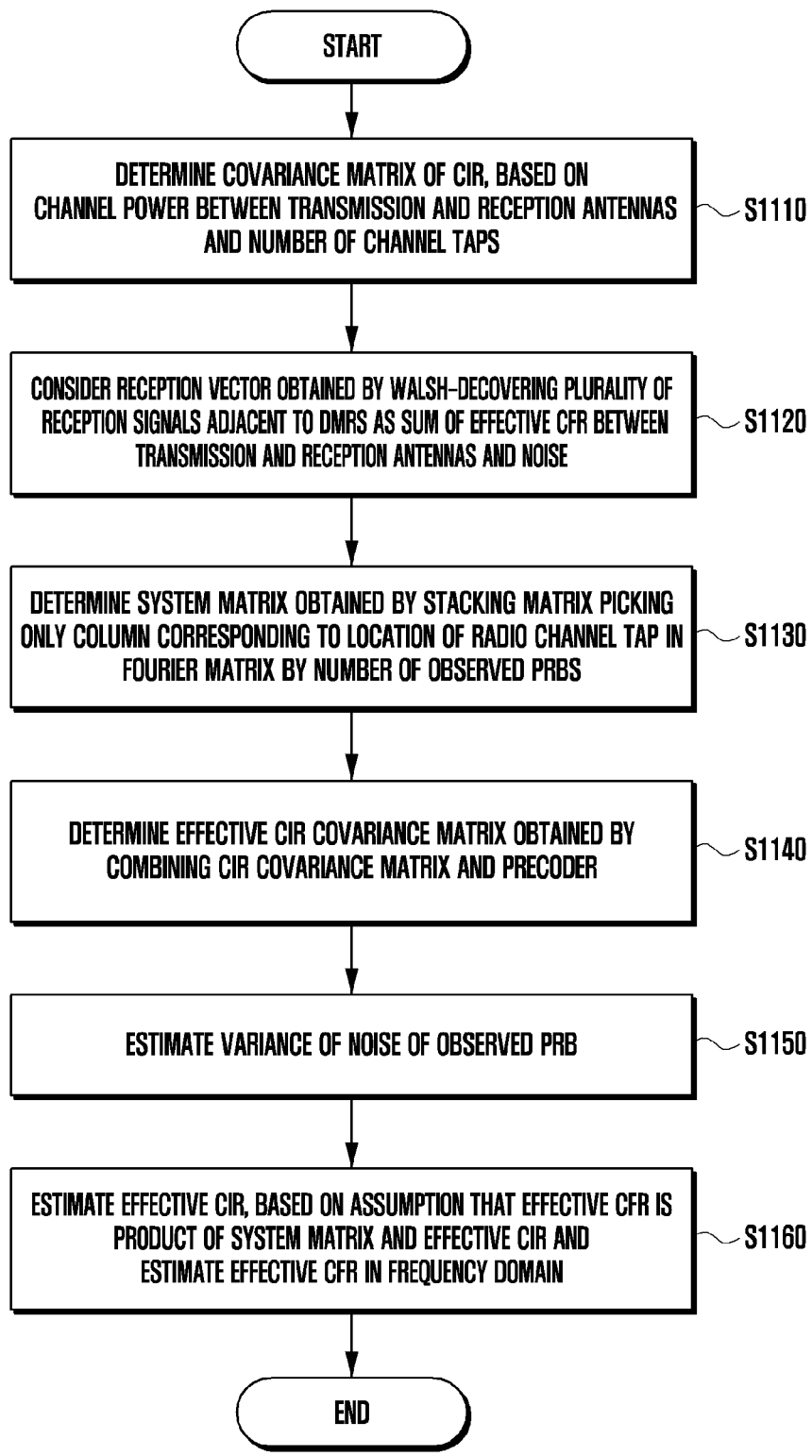
FIG. 11 is a flowchart illustrating a method of estimating a channel for each link between a transmission layer and a reception antenna according to an embodiment of the disclosure.

FIG. 11 is a flowchart illustrating a method of estimating a channel for each link between a transmission layer and a reception antenna according to an embodiment of the disclosure. The embodiment describes a method by which the BS first OCC-decovers the DMRS with the OCC and estimates a channel for each antenna link. Further, each step of FIG. 11 is not necessary, and some steps may be omitted.

First, in step S1110, the BS may estimate channel power between transmission and reception antennas and determine a covariance matrix of a CIR by dividing the channel power by the number of channel taps. The BS may consider that the channel power is uniformly allocated to each channel tap. Since two antenna ports are allocated to the UE, it may be assumed that the BS may receive SRSs transmitted from antenna 0 and antenna 1 of the UE.

The BS may estimate channel power between transmission and reception antennas from the SRS transmitted from antenna 0 and calculate power obtained by dividing the channel power by the number of channel taps. The BS may determine a covariance matrix of a CIR having the power as an entry of a diagonal matrix (diagonal entry). The BS may determine a covariance matrix of a CIR from the SRS transmitted from antenna 1 in the same way. The BS may calculate a covariance matrix having the covariance matrix of the CIR of antenna 0 and antenna 1 as a diagonal block and determine the covariance matrix of the CIR of antenna 0 and antenna 1.

Further, the BS may divide a sum of power of two channels estimated from antenna 0 and antenna 1 by the number of taps of the two channels and determine the covariance matrix of the CIR of antenna 0 and antenna 1 having the power as an entry of the diagonal matrix (diagonal entry).

In step S1120, the BS may consider a reception vector obtained by Walsh-decovering a plurality of reception signals adjacent to the DMRS as a sum of an effective CFR between transmission and reception antennas and noise. The BS may Walsh-decover two adjacent reception signals among reception signals of resource elements at which the DMRS, which is frequency-code division-multiplexed (F-FDM), is located.

In the above description, the case of the 1-symbol DMRS pattern and Type 1 are assumed, and thus the number of Walsh codes is two and the BS may obtain 2 reception vectors having the size of 3×1. The BS may consider each of the vectors as a sum of an effective CFR between transmission layer 0 and a reception antenna and noise and a sum of an effective CFR between transmission layer 1 and a reception antenna and noise. A detailed operation is described below.

The signal OCC-decovered by the BS may be expressed as described below.

$$y'_{m,0}(k+1) = \frac{y_m(k)o_0(k) + y_m(k+2)o_0(k+2)}{2}, k=0,4,8 \quad [\text{Equation 25}]$$

$$y'_{m,1}(k+1) = \frac{y_m(k)o_1(k) + y_m(k+2)o_1(k+2)}{2}, k=0,4,8 \quad [\text{Equation 26}]$$

When it is assumed that effective CFRs $g_{m,n}(k)$ and $g_{m,n}(k+2)$ are the same due to small selection of a channel frequency, [Equation 25] and [Equation 26] may be approximated as shown below.

$$y'_{m,0}(k) \approx g_{m,0}(k) + w'_{m,0}(k), k=1,5,9 \quad [\text{Equation 27}]$$

$$y'_{m,1}(k) \approx g_{m,1}(k) + w'_{m,1}(k), k=1,5,9 \quad [\text{Equation 28}]$$

In [Equation 27] and [Equation 28], $$w'_{m,0}(k+1) = \frac{w_m(k)o_0(k) + w_m(k+2)o_0(k+2)}{2}, k=0,4,8 \quad [\text{Equation 29}]$$

$$w'_{m,1}(k+1) = \frac{w_m(k)o_1(k) + w_m(k+2)o_1(k+2)}{2}, k=0,4,8 \quad [\text{Equation 30}]$$

are established, and a variance of $w'_{m,n}(k)$ is $\sigma_w^2/2$, and values to be estimated are effective CFRs $g_{m,0}(k)$ and $g_{m,1}(k)$ from layer 0 and layer 1 to reception antenna 1 in RE k. Since the number of samples after decovering of PRB u is 3, a reception vector $y'_{m,n}{}^{(u)} = [y'_{m,n}{}^{(u)}(1) \ y'_{m,n}{}^{(u)}(5) \ y'_{m,n}{}^{(u)}(9)]^T$, an effective CFR vector $g_{m,n}{}^{(u)} = [g_{m,n}{}^{(u)}(1) \ g_{m,n}{}^{(u)}(5) \ g_{m,n}{}^{(u)}(9)]^T$, and a noise vector $w'_{m,n}{}^{(u)} = [w'_{m,n}{}^{(u)}(1) \ w'_{m,n}{}^{(u)}(5) \ w'_{m,n}{}^{(u)}(9)]^T$ may be defined for PRB u. Then, a reception vector may be expressed as shown below.

$$y'_{m,n}{}^{(u)} \approx g_{m,n}{}^{(u)} + w'_{m,n}{}^{(u)} \quad [\text{Equation 31}]$$

In step S1130, the BS may determine a system matrix obtained by stacking a matrix picking only columns corresponding to the locations of the radio channel taps in a Fourier matrix by the number of observed PRBs. The locations of the radio channel taps are estimated from the SRS by the BS, and the BS may determine the system matrix by stacking columns determined on the basis of the locations of the radio channel taps A detailed operation is described below.

When the FFT size is N, a system matrix $F'^{(u)}$ may be a submatrix having the size of 3×L including a row vector corresponding to physical RE indexes of RE {1, 5, 9} of PRB u and a column vector at channel tap locations of L channel coefficient values in an N×N Fourier matrix. The effective CFR $g_{m,n}{}^{(u)}(k)$ may be expressed as a product of the system matrix and the effective CIR $\gamma_{m,n}$ (l) below.

$$g_{m,n}{}^{(u)} = F'^{(u)} \gamma_{m,n} \quad [\text{Equation 32}]$$

In [Equation 32], when a reception signal and a noise signal in $N_{PRB}$ PRBs are defined as $$y'_m = \left[ \left( y'^{(u_0)}_m \right)^T \cdots \left( y'^{(u_{N_{PRB}-1})}_m \right)^T \right]^T \text{ and } w'_m = \left[ \left( w'^{(u_0)}_m \right)^T \cdots \left( w'^{(u_{N_{PRB}-1})}_m \right)^T \right]^T,$$

respectively, [Equation 33] below may be obtained.

$$y'_{m,n} \approx F' \gamma_{m,n} + w'_{m,n} \quad [\text{Equation 33}]$$

In [Equation 33], the system matrix is as shown below.

$$F' = \begin{bmatrix} F'^{(u_0)} \\ \vdots \\ F'^{(u_{N_{PRB}-1})} \end{bmatrix} \in \mathbb{C}^{3N_{PRB} \times L} \quad [\text{Equation 34}]$$

In step S1140, the BS may determine a covariance matrix of an effective CIR obtained by combining the covariance matrix of the CIR and the precoder. The BS may know the precoder at the receiver. A detailed operation is described below.

[Equation 11] may be expressed as [Equation 35] below.

$$C_{\eta_m} = (P^T \otimes I_L) C_{\eta_m} (P^* \otimes I_L) \quad [\text{Equation 35}]$$

In [Equation 35], $C_{\eta_m}$ is a covariance matrix of $\eta_m$, and may be determined as shown below on the basis of the assumption that channel power is estimated from the SRS and a variance of a channel coefficient located at each tap is the same.

$$C_{\eta_m} = \begin{bmatrix} \sigma^2_{\eta_{m,0}} I_L & \\ & \sigma^2_{\eta_{m,1}} I_L \end{bmatrix} \quad [\text{Equation 36}]$$

In [Equation 36], $\sigma^2_{\eta_{m,n'}}$ may be power of a predetermined channel tap coefficient between Tx antenna n' and Rx antenna m. Actually, the estimate $\hat{\sigma}^2_{\eta_{m,n'}}$ may be obtained using the SRS in the UL and using the CSI-RS in the DL. Since two precoder matrixes $$P = \frac{1}{2}\begin{bmatrix} 1 & 1 \\ 1 & -1 \end{bmatrix} \text{ and } P = \frac{1}{2}\begin{bmatrix} 1 & 1 \\ j & -j \end{bmatrix}$$

are supported in the NR UL, the following equations may be expressed below as shown in [Equation 35].

$$C_{\gamma_m} = \frac{1}{4}\begin{bmatrix}(\sigma_{\eta_{m,0}}^2+\sigma_{\eta_{m,1}}^2)I_L & (\sigma_{\eta_{m,0}}^2-\sigma_{\eta_{m,1}}^2)I_L \\ (\sigma_{\eta_{m,0}}^2-\sigma_{\eta_{m,1}}^2)I_L & (\sigma_{\eta_{m,0}}^2+\sigma_{\eta_{m,1}}^2)I_L\end{bmatrix} \quad \text{[Equation 37]}$$

$$C_{\eta_{m,n}} = \frac{1}{4}(\sigma_{\eta_{m,0}}^2+\sigma_{\eta_{m,1}}^2)I_L, n=0,1 \quad \text{[Equation 38]}$$

In step S1150, the BS may estimate a noise variance of an observed PRB.

In step S1160, the BS may estimate an effective CIR on the assumption that the effective CFR is the product of the system matrix and the effective CIR and estimate the effective CFR in a frequency domain. The BS may estimate the effective CIR and the effective CFR through a regularized maximum likelihood (ML) scheme. Further, the BS may determine a first submatrix having the size of L×L located on a diagonal line in the covariance matrix of the effective CIR as an effective CIR matrix between transmission layer 0 and a reception antenna, and determine a second submatrix having the size of L×L located on a diagonal line in the covariance matrix of the effective CIR as an effective CIR matrix between transmission layer 1 and a reception antenna. A detailed operation is described below.

In [Equation 33], the estimate of the effective CIR $\hat{\gamma}_{m,n}$ is as shown below.

$$\hat{\gamma}_{m,n} = \left(F'^H F' + \frac{\sigma_w^2}{2}C_{\gamma_{m,n}}^{-1}\right)^{-1} F'^H y'_{m,n} \quad \text{[Equation 39]}$$

An estimate of an effective CFR vector $f_{m,n}^{(u)}$ of the RE between reception antenna m and layer n in PRB u carrying a shared channel is as shown below.

$$\hat{f}_{m,n}^{(u)} = \Psi^{(u)}\hat{\gamma}_{m,n} \quad \text{[Equation 40]}$$

In [Equation 40], $\Psi^{(u)}$ is a data tone Fourier matrix and may transform data from a time domain to a frequency domain. When it is assumed that only one of DMRS transmission antenna port 0 and DMRS transmission antenna port 1 is activated at F-CDM RE locations, the estimate of the effective CFR vector $f_{m,n}^{(u)}$ of reception antenna m in RB u may be expressed as shown below.

The case in which only DMRS transmission antenna port 0 is activated at the F-CDM RE location is described below.

$$\hat{f}_{m,0}^{(u)} = \Psi^{(u)}(F'^H F' + \sigma_w^2 C_{\gamma_{m,0}}^{-1}/2)^{-1} F'^H y'_{m,0} \quad \text{[Equation 41]}$$

The case in which only DMRS transmission antenna port 1 is activated at the F-CDM RE location is described below.

$$\hat{f}_{m,1}^{(u)} = \Psi^{(u)}(F'^H F' + \sigma_w^2 C_{\gamma_{m,1}}^{-1}/2)^{-1} F'^H y'_{m,1} \quad \text{[Equation 42]}$$

In [Equation 41] and [Equation 42], the covariance matrix of the effective CIR is as shown below.

$$C_{\gamma_{m,n}} = \frac{1}{2}(\sigma_{\eta_{m,0}}^2+\sigma_{\eta_{m,1}}^2)I_L, n=0,1 \quad \text{[Equation 43]}$$

Figure 12:
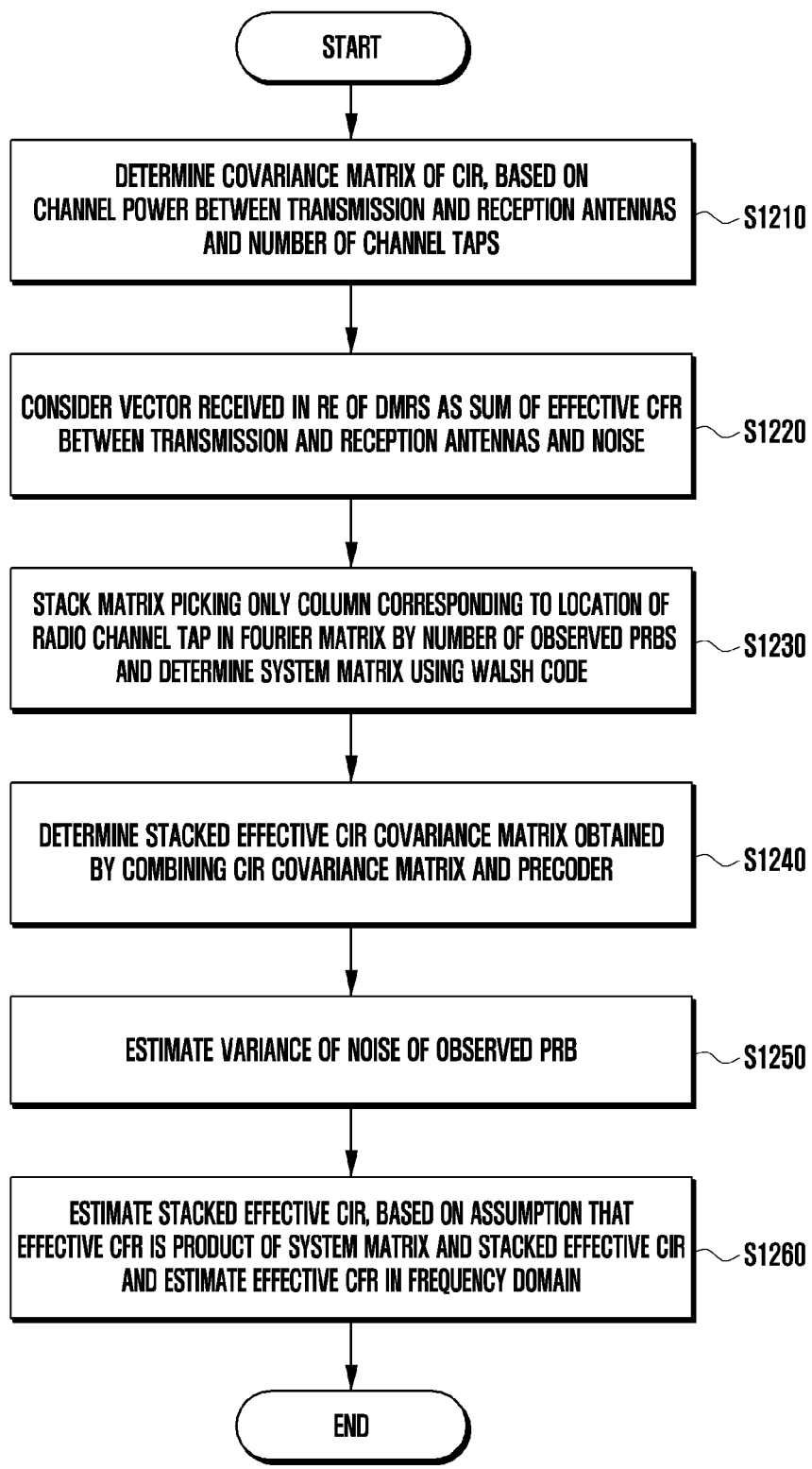
FIG. 12 is a flowchart illustrating a method of jointly estimating channels for a link between a transmission layer and a reception antenna according to embodiments of the disclosure.

Meanwhile, FIG. 12 is a flowchart illustrating a method of jointly estimating a channel for a link between a transmission layer and a reception antenna according to an embodiment of the disclosure. The embodiment relates to a method by which the BS jointly estimates a channel for links between a plurality of transmission layers and reception antennas rather than separately estimating a channel for each link between one transmission layer and one reception antenna. Further, each step of FIG. 12 is not necessary, and some steps may be omitted.

First, in step S1210, the BS may estimate channel power between transmission and reception antennas and determine a covariance matrix of a CIR by dividing the channel power by the number of channel taps. A method by which the BS determines the covariance of the CIR may correspond to step S1110 of FIG. 11.

In step S1220, the BS may consider a vector received in an RE of the DMRS as a sum of an effective CFR between transmission and reception antennas and noise. In the above description, the case of a 1-symbol DMRS pattern and Type 1 are assumed, and thus the BS may obtain 1 reception vector having the size of 6×1. Further, the BS may consider the vector as a sum of an effective CFR between transmission layer 0 and a reception antenna, an effective CFR between transmission layer 1 and a reception antenna, and noise.

In step S1230, the BS may stack a matrix obtained by picking only columns corresponding to the locations of the radio channel taps from a Fourier matrix by the number of observed PRBs and determine a system matrix using a Walsh code. Since the case of the 1-symbol DMRS pattern and Type 1 and the case in which channels are jointly estimated for links between a plurality of transmission and repletion antennas are assumed, the BS may determine the system matrix by applying Walsh code 0 and Walsh code 1.

In step S1240, the BS may determine the stacked covariance matrix of the effective CIR obtained by combining the covariance matrix of the CIR and the precoder. A method by which the BS determines the stacked covariance matrix of the effective CIR may correspond to step S1140 of FIG. 11.

In step S1250, the BS may estimate a noise variance of an observed PRB.

In step S1260, the BS may estimate an effective CIR on the assumption that the effective CFR is the product of the system matrix and the effective CIR and estimate the effective CFR in a frequency domain. The BS may estimate the effective CIR and the effective CFR through a regularized maximum likelihood (ML) scheme. A detailed operation is described below.

The reception vector in [Equation 4] above may be expressed as shown below.

$$y_m = \Phi\gamma_m + w_m \quad \text{[Equation 44]}$$

The estimate of the effective CIR $\hat{\gamma}_m$ may be expressed as shown below.

$$\hat{\gamma}_m = (\Phi^H\Phi + \sigma_w^2 C_{\gamma_m}^{-1})^{-1}\Phi^H y_m \quad \text{[Equation 45]}$$

In [Equation 45], the system matrix may be expressed as shown below.

$$\Phi = [(I_{N_{PRB}} \otimes O_0)F \ (I_{N_{PRB}} \otimes O_1)F] \in \mathbb{C}^{6N_{PRB}\times 2L} \quad \text{[Equation 46]}$$

$$\Phi^H\Phi = \begin{bmatrix} F^H F & F^H(I_{N_{PRB}} \otimes O_1)F \\ F^H(I_{N_{PRB}} \otimes O_1)F & F^H F \end{bmatrix} \quad \text{[Equation 47]}$$

F is defined in [Equation 22] above. If DMRS transmission antenna port 0 or DMRS transmission antenna port 1 is allocated to the UE, the following equation may be obtained from [Equation 37] above.

$$C_{\gamma_m}^{-1} = \frac{1}{\sigma_{\eta_{m,0}}^2 \sigma_{\eta_{m,1}}^2} \begin{bmatrix} (\sigma_{\eta_{m,0}}^2 + \sigma_{\eta_{m,1}}^2)I_L & -(\sigma_{\eta_{m,0}}^2 - \sigma_{\eta_{m,1}}^2)I_L \\ -(\sigma_{\eta_{m,0}}^2 - \sigma_{\eta_{m,1}}^2)I_L & (\sigma_{\eta_{m,0}}^2 + \sigma_{\eta_{m,1}}^2)I_L \end{bmatrix} \quad \text{[Equation 48]}$$

A regularized ML estimate of the effective CFR vector $f_m^{(u)}$ of the RE in reception antenna m on PRB u carrying the shared channel is as shown below.

$$\hat{f}_m^{(u)} = \begin{bmatrix} \Psi^{(u)} & \\ & \Psi^{(u)} \end{bmatrix} \hat{\gamma}_m \quad \text{[Equation 49]}$$

When it is assumed that only one of DMRS transmission antenna port 0 and DMRS transmission antenna port 1 is activated at F-CDM RE locations, the estimate of the regularized ML channel of the effective CFR vector $f_{m,n}^{(u)}$ of reception antenna m on RB u may be expressed as shown below. The case in which only DMRS transmission antenna port 0 is activated at the F-CDM RE location is described below.

$$\hat{f}_{m,0}^{(u)} = \Psi^{(u)}(F^H F + \sigma_w^2 C_{\gamma_{m,0}}^{-1})^{-1} F^H (I_{N_{PRB}} \otimes O_0) y_m \quad \text{[Equation 50]}$$

The case in which only DMRS transmission antenna port 1 is activated at the F-CDM RE location is described below.

$$\hat{f}_{m,1}^{(u)} = \Psi^{(u)}(F^H F + \sigma_w^2 C_{\gamma_{m,1}}^{-1})^{-1} F^H (I_{N_{PRB}} \otimes O_1) y_m \quad \text{[Equation 51]}$$

In [Equation 50] and [Equation 51], the covariance matrix of the effective CIR is as shown below.

$$C_{\gamma_{m,n}} = \frac{1}{2}(\sigma_{\eta_{m,0}}^2 + \sigma_{\eta_{m,1}}^2)I^L, \; n=0,1 \quad \text{[Equation 52]}$$

When DMRS transmission antenna port 2 or DMRS transmission antenna port 3 is allocated to the UE, the BS may estimate the effective CFR through a method similar to that in FIG. 12 also in the case in which DMRS transmission antenna port 4 or DMRS transmission antenna port 5 is allocated to the UE.

Figure 13A:
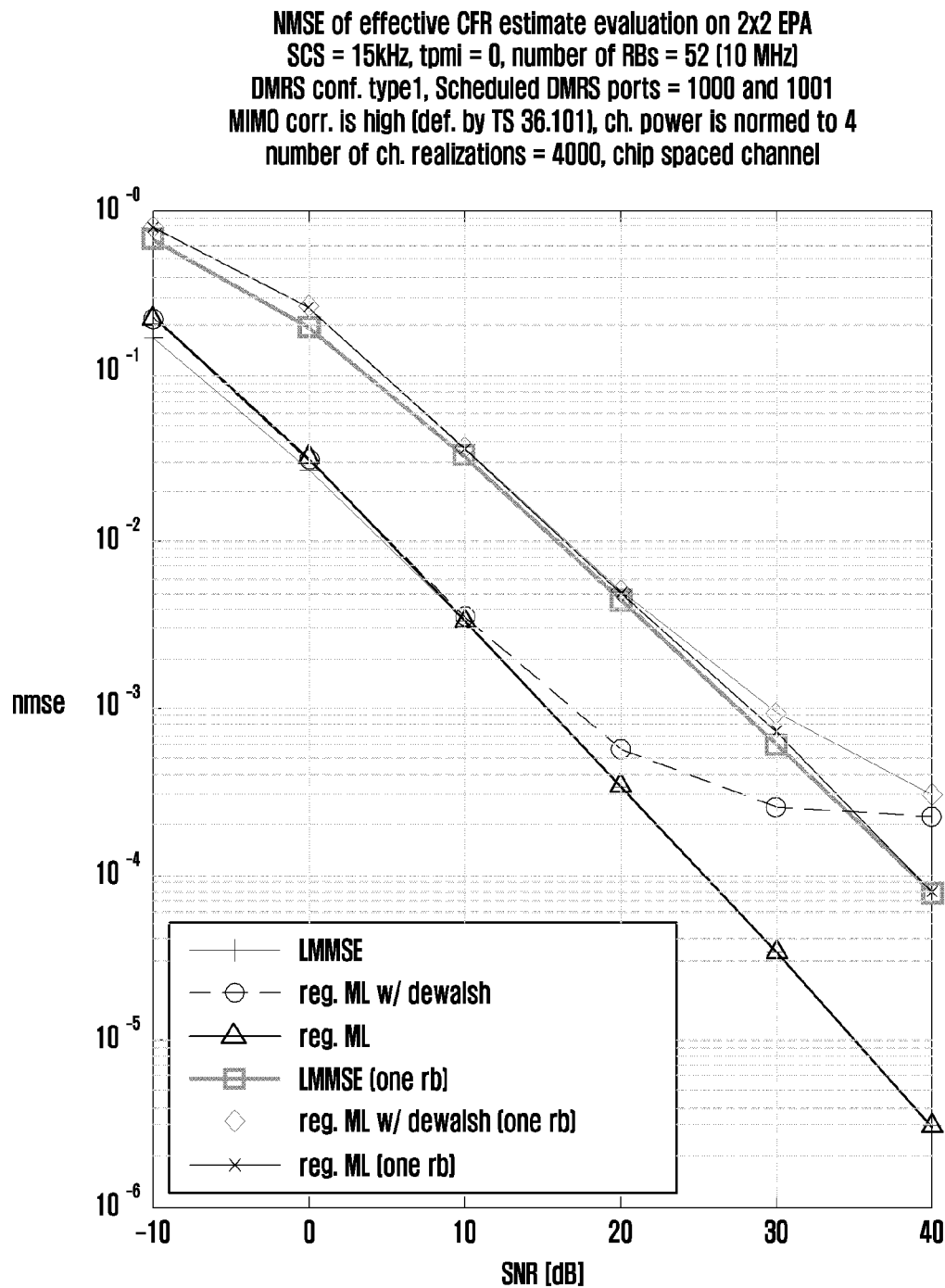
FIGS. 13A and 13B illustrate performance of an estimate of an effective CFR under an EPA channel.
Figure 13B:
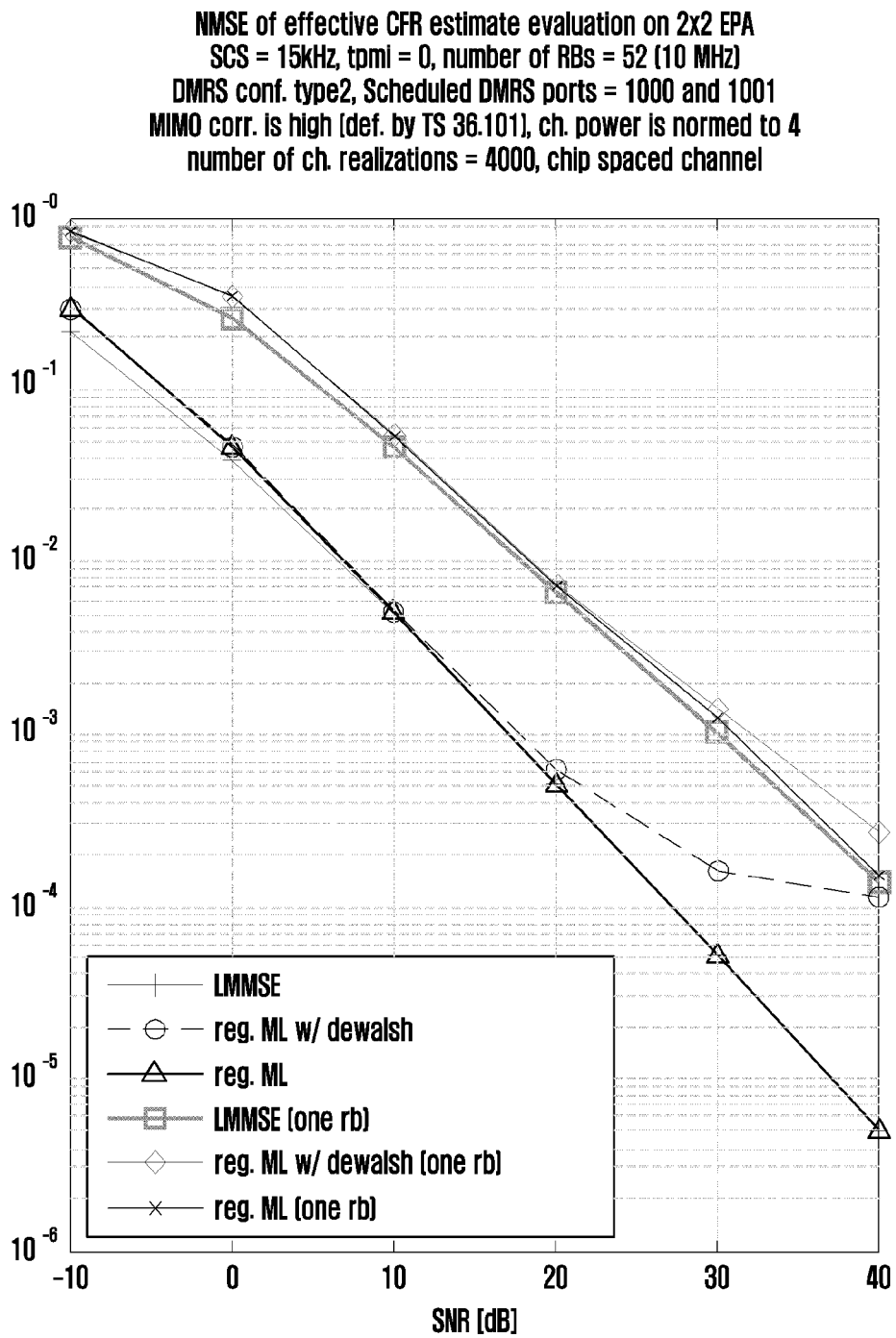
Figure 14A:
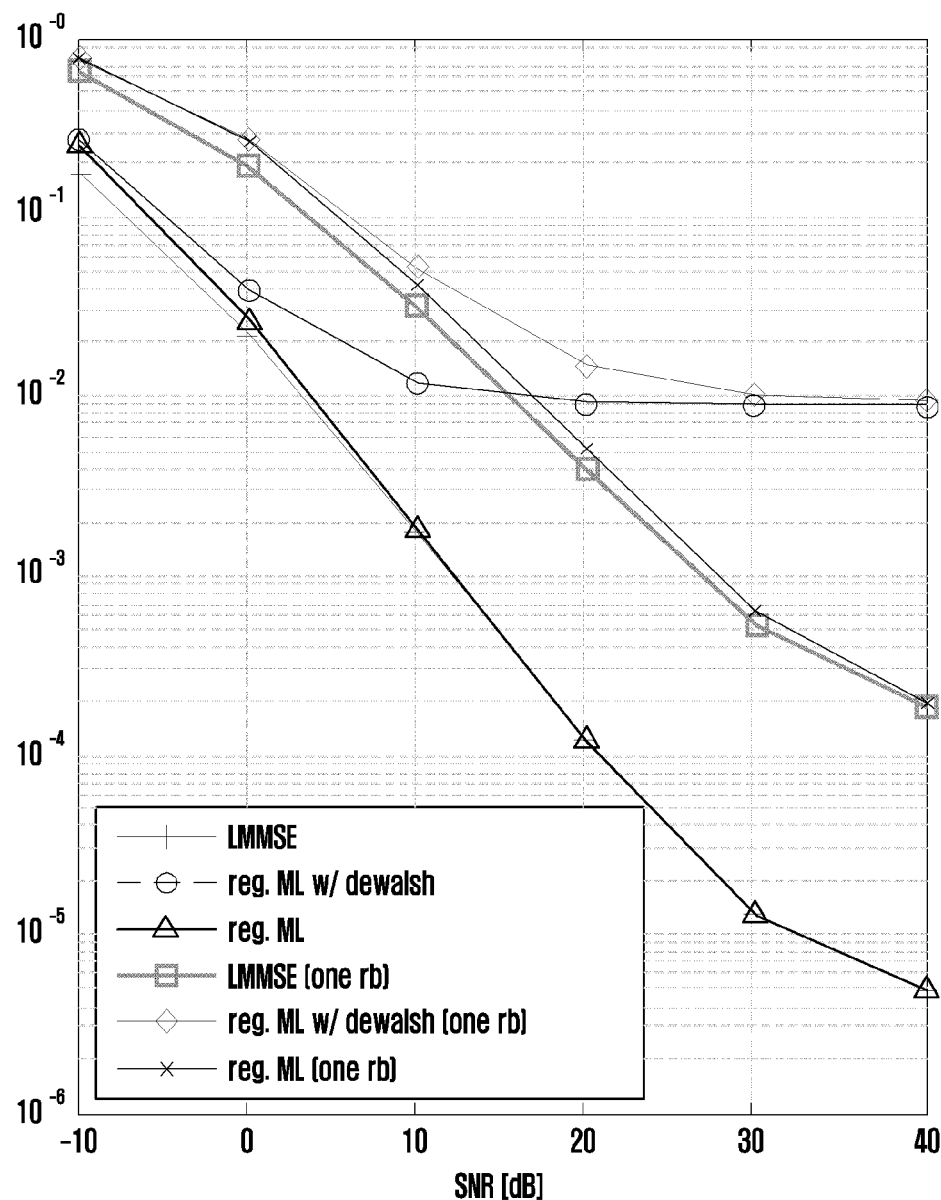
FIGS. 14A and 14B illustrate performance of an estimate of an effective CFR under an ETU channel.
Figure 14B:
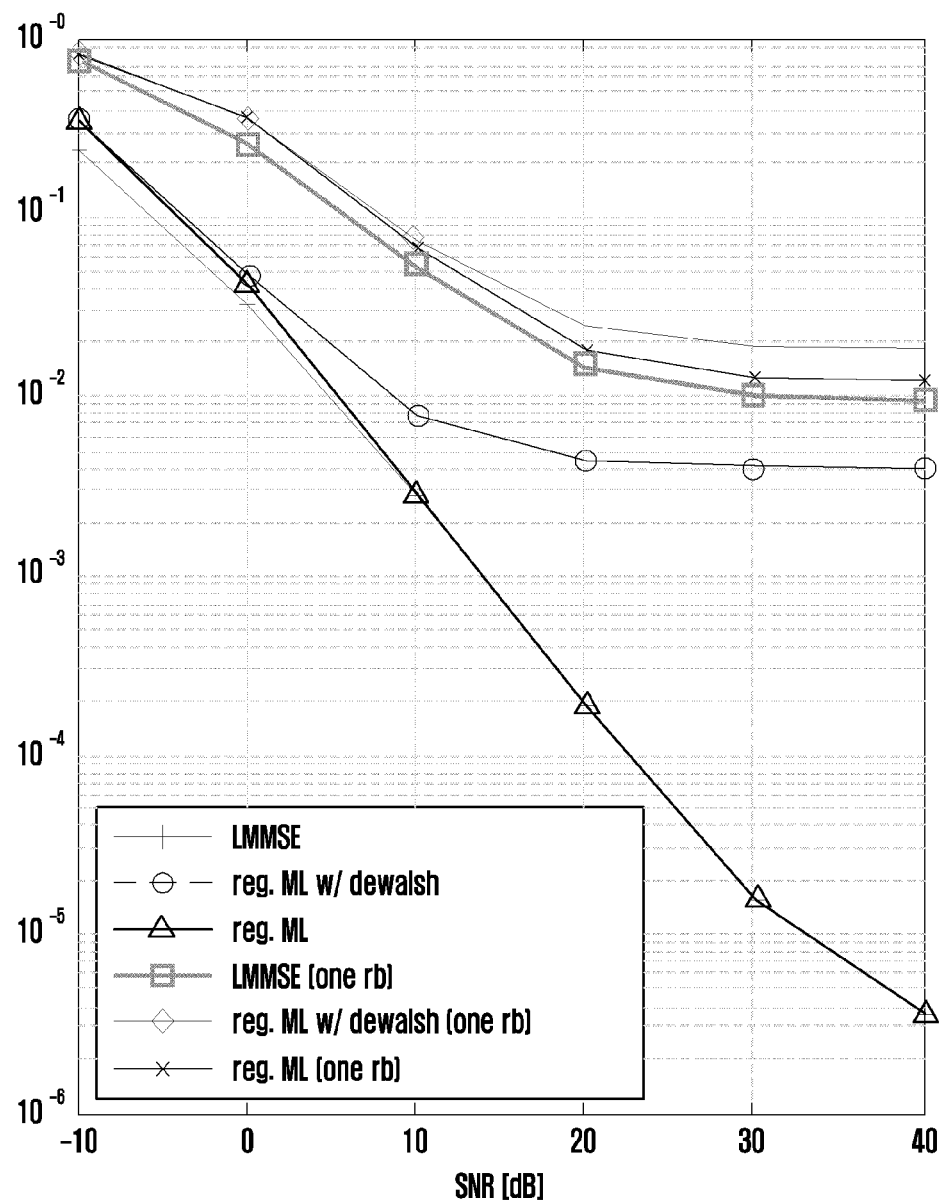

FIGS. 13A and 13B illustrate performance of an effective CFR estimation value in an EPA channel, and FIGS. 14A and 14B illustrate performance of an effective CFR estimation value in an ETU channel. FIGS. 13A, 13B, 14A, and 14B show normalized mean square error (NMSE) performance of an effective CFR estimation value in various channel estimation schemes. It may be assumed that a system bandwidth is 10 MHz and the number of PRBs scheduled in the UE is 52 or 1. As the number of PRBs is larger, the number of REs occupied by DMRSs increases, and thus channel estimation performance may be improved. In the above description, an SNR indicates a signal to noise ratio in the RE.

In FIGS. 13A and 13B, a channel is static, and a delay and a power profile are EPA channels of [0 30 70 90 110 190 410]•ns and [0.3213 0.2552 0.2027 0.1610 0.0509 0.0061 0.0027], respectively. The multipath of the channels is independent and follows zero-mean normal distribution. A channel implemented to follow the distribution may be scaled to have total power of 4.

In FIGS. 14A and 14B, a channel is static, and a delay and a power profile are ETU channels of [0 50 120 200 230 500 1600 2300 5000]•ns and [0.1241 0.1241 0.1241 0.1563 0.1563 0.1563 0.0783 0.0494 0.0312], respectively. The multipath of the channels is independent and follows zero-mean normal distribution. A channel implemented to follow the distribution may be scaled to have total power of 4.

FIG. 13A illustrates the case of DMRS configuration type 1 in which a channel is an EPA, and FIG. 13B illustrates the case of DMRS configuration type 2 in which a channel is an EPA. FIG. 14A illustrates the case of DMRS configuration type 1 in which a channel is an ETU, and FIG. 14B illustrates the case of DMRS configuration type 2 in which a channel is an ETU.

In FIGS. 13A and 13B, an LMMSE channel estimation scheme shows the best performance. In FIG. 13A, it may be noted that in the case in which 52 PRBs are allocated in an EPA channel 10^-2 NMSE has a more excellent performance of 11.2 dB than the case in which 1 PRB is allocated. When 52 PRBs are allocated, a reception DMRS is first OCC-decovered (=deWalsh), and channel estimation is performed for each link between one transmission layer and one reception antenna, it may be noted that an error floor occurs near 20 dB. When 1 PRB is allocated, a reception DMRS is first OCC-decovered (=deWalsh), and channel estimation is performed for one transmission layer and for each antenna link, it may be noted that an error floor appears near 30 dB.

Meanwhile, when an effective CFR between two transmission layers and a reception antenna is also estimated, it may be noted that an error floor does not appear and channel estimation performance similar to the LMMSE channel estimation performance is shown. It may be noted that FIG. 13B has a similar trend.

In FIGS. 14A and 14B, an LMMSE channel estimation scheme shows the best performance. In FIG. 14A, it may be noted that in the case in which 52 PRBs are allocated in an ETU channel 10^-2 NMSE has a more excellent performance of 13.3 dB than the case in which 1 PRB is allocated. When 52 PRB is allocated, a reception DMRS is first OCC-decovered (=deWalsh), and channel estimation is performed for one transmission layer and for each antenna link, it may be noted that an error floor occurs near 0 dB. When 1 PRB is allocated, a reception DMRS is first OCC-decovered (=deWalsh), and channel estimation is performed for each link between one transmission layer and one reception antenna, it may be noted that an error floor appears near 10 dB.

Meanwhile, when an effective CFR between two transmission layers and a reception antenna is also estimated, it may be noted that an error floor does not appear and channel estimation performance similar to the LMMSE channel estimation performance is shown. It may be noted that FIG. 14B has a similar trend.

That is, as a result, it may be noted that a high-performance channel estimator is needed when 64 QAM and high rate data close to code rate 1 are used in the UL in a channel such as an ETU channel having heavy frequency selection and the DMRS is F-code division-multiplexed (CDM) for MIMO (of a strong electric field having an SNR higher than or equal to 10 dB), and it may be noted that the disclosure has a very excellent channel estimation performance in such an environment.

Figure 15:
FIG. 15 is a block diagram illustrating an internal structure of a BS according to an embodiment of the disclosure.

FIG. 15 is a block diagram illustrating an internal structure of a BS according to an embodiment of the disclosure. As illustrated in FIG. 15, the BS according to the disclosure may include a transceiver 1510 and a controller 1520.

The transceiver 1510 of the BS may transmit and receive messages between the BS and a UE. To this end, the transceiver 1510 may include a wired or wireless interface. The transceiver 1510 may receive an SRS from the UE.

The controller 1520 of the BS may control the overall operation of the BS. In the case of uplink channel estimation, the controller 1520 may estimate the location of a radio channel tap on the basis of the SRS received from the UE, determine an average power value of the radio channel tap for each link between a transmission antenna in which the SRS is transmitted and a reception antenna, and estimate an effective CFR of a PUSCH on the basis of the location of the radio channel tap and the average power value of the radio channel tap. The operation of the controller 1520 may correspond to FIG. 9.

The controller 1520 may determine a covariance matrix of the effective CIR on the basis of the assumption that channel power between the transmission antenna and the reception antenna is uniformly allocated to each channel tap, determine a system matrix on the basis of the location of the radio channel tap, estimate a variance of interference and noise on the basis of the DMRS received from the UE, estimate the effective CIR on the basis of the covariance matrix of the effective CIR, the system matrix, and the variance of the interference and noise, perform FFT on the effective CIR in a frequency domain, and estimate the effective CFR of a resource element carrying a PUSCH. The operation of the controller 1520 may correspond to FIG. 10.

According to an embodiment of the disclosure, when channel estimation is performed for each link between one transmission layer and one reception antenna after OCC decovering, the controller 1520 may stack a matrix picking only a column corresponding to the location of the radio channel tap acquired from the SRS in a Fourier matrix by the number of observed PRBs, determine the system matrix, and estimate the effective CIR on the basis of signals obtained by performing Walsh decovering on a plurality of adjacent reception signals among reception signals of resource elements at which F-CDM DMRSs are located. The operation of the controller 1520 may correspond to FIG. 11.

According to an embodiment of the disclosure, when channel estimation is jointly performed for links between a plurality of transmission layers and reception antennas, the controller 1520 may stack a matrix picking only a column corresponding to the location of the radio channel tap acquired from the SRS in a Fourier matrix by the number of observed PRBs, determine the system matrix using a Walsh code, and estimate the effective CIR on the basis of a reception signal of a resource element at which the DMRS acquired for each PRB is located according to the number and type of symbols of the F-CDM DMRS. The operation of the controller 1520 may correspond to FIG. 12.

The controller 1520 may determine a covariance matrix of a CIR with diagonal entries by estimating channel power on each of a plurality of transmission and reception antennas and dividing the channel power by the number of channel taps or dividing a sum of the channel power on the plurality of transmission and reception antennas by a sum of the numbers of channel taps. The operation of the controller 1520 may correspond to step S1110 of FIG. 11 and step S1210 of FIG. 12.

Figure 16:
FIG. 16 is a block diagram illustrating an internal structure of a UE according to an embodiment of the disclosure.

FIG. 16 is a block diagram illustrating an internal structure of a UE according to an embodiment of the disclosure. As illustrated in FIG. 16, the UE according to the disclosure may include a transceiver 1610 and a controller 1620.

The transceiver 1610 of the UE may transmit and receive messages between the BS and the UE. To this end, the transceiver 1610 may include a wired or wireless interface. The transceiver 1610 may receive a CSI-RS from the BS.

The controller 1620 of the UE may control the overall operation of the UE. In the case of downlink channel estimation, the controller 1620 may estimate the location of a radio channel tap on the basis of the CSI-RS received from the BS, determine an average power value of the radio channel tap for each link between a transmission antenna in which the SRS is transmitted and a reception antenna, and estimate an effective CFR of a PDSCH on the basis of the location of the radio channel tap and the average power value of the radio channel tap. The operation of the controller 1620 may correspond to the operation of the BS of FIG. 15 with only difference in entities performing the operation and received reference signals.

The controller 1620 may determine a covariance matrix of the effective CIR on the basis of the assumption that channel power between the transmission antenna and the reception antenna is uniformly allocated to each channel tap, determine a system matrix on the basis of the location of the radio channel tap, estimate a variance of interference and noise on the basis of the DMRS received from the BS, estimate the effective CIR on the basis of the covariance matrix of the effective CIR, the system matrix, and the variance of the interference and noise, transform FFT on the effective CIR in a frequency domain, and estimate an effective CFR of a resource element carrying a PDSCH.

According to an embodiment of the disclosure, when channel estimation is performed for each link between one transmission layer and one reception antenna after OCC decovering, the controller 1620 may stack a matrix picking only a column corresponding to the location of the radio channel tap acquired from the CSI-RS in a Fourier matrix by the number of observed PRBs, determine the system matrix, and estimate the effective CIR on the basis of signals obtained by performing Walsh decovering on a plurality of adjacent reception signals among reception signals of resource elements at which F-CDM DMRSs are located.

According to an embodiment of the disclosure, when channel estimation is jointly performed for links between a plurality of transmission layers and reception antennas, the controller 1620 may stack a matrix picking only a column corresponding to the location of the radio channel tap acquired from the CSI-RS in a Fourier matrix by the number of observed PRBs, determine the system matrix using a Walsh code, and estimate the effective CIR on the basis of a reception signal of a resource element at which the DMRS acquired for each PRB is located according to the number and type of symbols of the F-CDM DMRS.

The controller 1620 may determine a covariance matrix of a CIR with diagonal entries by estimating channel power on each of a plurality of transmission and reception antennas and dividing the channel power by the number of channel taps or dividing a sum of the channel power on the plurality of transmission and reception antennas by a sum of channel taps.

The embodiments of the disclosure described and shown in the specification and the drawings have been presented to easily explain the technical contents of the embodiments of the disclosure and help understanding of the embodiments of the disclosure, and are not intended to limit the scope of the embodiments of the disclosure. It will be apparent to those skilled in the art that, in addition to the embodiments disclosed herein, other variants may be achieved on the basis of the technical idea of the disclosure.

The invention claimed is:

1. A method of estimating an uplink channel by a base station in a wireless communication system, the method comprising:
    identifying locations of one or more radio channel taps, based on a sounding reference signal (SRS) received from a terminal;
    determining an average power value of the one or more radio channel taps for each link between a transmission antenna of the terminal in which the SRS is transmitted and a reception antenna of the base station in which the SRS is received; and estimating an effective channel frequency response (CFR) of a physical uplink shared channel (PUSCH), wherein the estimating of the effective CFR comprises:

estimating a variance of interference and noise, based on a demodulation reference signal (DMRS) received from the terminal; and estimating the effective CFR based on the locations of the one or more radio channel taps, the average power value of the one or more radio channel taps, and the variance of the interference and noise.

2. The method of claim 1, wherein the estimating of the effective CFR comprises:

determining a covariance matrix of an effective channel impulse response (CIR), based on assumption that channel power between the transmission antenna and the reception antenna is uniformly allocated to each channel tap;

determining a system matrix, based on the locations of the radio channel taps;

estimating an effective CIR, based on the covariance matrix of the effective CIR, the system matrix, and the variance of the interference and noise; and estimating an effective CFR of a resource element carrying the PUSCH by performing fast Fourier transform (FFT) on the effective CIR in a frequency domain.

3. The method of claim 2, wherein the determining of the system matrix comprises stacking a matrix picking only a column corresponding to the locations of the one or more radio channel taps obtained from the SRS in a Fourier matrix by a number of observed physical resource blocks (PRBs), and wherein the estimating of the effective CIR comprises estimating the effective CIR, based on signals obtained by performing Walsh decovering on a plurality of adjacent reception signals among reception signals of resource elements at which frequency-code division-multiplexed (F-CDM) DMRSs are located.

4. The method of claim 2, wherein the determining of the system matrix comprises stacking a matrix picking only a column corresponding to the locations of the one or more radio channel taps obtained from the SRS in a Fourier matrix by a number of observed physical resource blocks (PRBs) and determining the system matrix using a Walsh code, wherein the estimating of the effective CIR comprises estimating the effective CIR, based on a reception signal of a resource element at which the DMRS obtained for each PRB is located according to a number and type of symbols of frequency-code division-multiplexed (F-CDM) DMRSs, and wherein the determining of the covariance matrix of the effective CIR comprises determining diagonal entries of a diagonal matrix by estimating channel power on each of a plurality of transmission and reception antennas and dividing the channel power by a number of the one or more radio channel taps, or by dividing a sum of the channel power on the plurality of transmission and reception antennas by a sum of the number of the one or more radio channel taps.

5. A method of estimating a downlink channel by a terminal in a wireless communication system, the method comprising:

identifying locations of one or more radio channel taps, based on a channel state information reference signal (CSI-RS) received from a base station;

determining an average power value of the one or more radio channel taps for each link between a transmission antenna of the base station in which the CSI-RS is transmitted and a reception antenna of the terminal in which the CSI-RS is received; and estimating an effective channel frequency response (CFR) of a physical downlink shared channel (PDSCH), wherein the estimating of the effective CFR comprises:

estimating a variance of interference and noise, based on a demodulation reference signal (DMRS) received from the base station; and estimating the effective CFR based on the locations of the one or more radio channel taps, the average power value of the one or more radio channel taps, and the variance of the interference and noise.

6. The method of claim 5, wherein the estimating of the effective CFR comprises;

determining a covariance matrix of an effective channel impulse response (CIR), based on assumption that channel power between the transmission antenna and the reception antenna is uniformly allocated to each channel tap;

determining a system matrix, based on the locations of the radio channel taps;

estimating an effective CIR, based on the covariance matrix of the effective CIR, the system matrix, and the variance of the interference and noise; and estimating an effective CFR of a resource element carrying the PDSCH by performing fast Fourier transform (FFT) on the effective CIR in a frequency domain.

7. The method of claim 6, wherein the determining of the system matrix comprises stacking a matrix picking only a column corresponding to the locations of the one or more radio channel taps obtained from the CSI-RS in a Fourier matrix by a number of observed physical resource blocks (PRBs), and wherein the estimating of the effective CIR comprises estimating the effective CIR, based on signals obtained by performing Walsh decovering on a plurality of adjacent reception signals among reception signals of resource elements at which frequency-code division-multiplexed (F-CDM) DMRSs are located.

8. The method of claim 6, wherein the determining of the system matrix comprises stacking a matrix picking only a column corresponding to the locations of the one or more radio channel taps obtained from the CSI-RS in a Fourier matrix by a number of observed physical resource blocks (PRBs) and determining the system matrix using a Walsh code, wherein the estimating of the effective CIR comprises estimating the effective CIR, based on a reception signal of a resource element at which the DMRS obtained for each PRB is located according to a number and type of symbols of frequency-code division-multiplexed (F-CDM) DMRSs, and wherein the determining of the covariance matrix of the effective CIR comprises determining diagonal entries of a diagonal matrix by estimating channel power on each of a plurality of transmission and reception antennas and dividing the channel power by a number of the one or more radio channel taps, or by dividing a sum of the channel power on the plurality of transmission and reception antennas by a sum of the number of the one or more radio channel taps.

9. A base station for estimating an uplink channel in a wireless communication system, the base station comprising:
a transceiver configured to transmit and receive a signal; and
a controller configured to:
identify locations of one or more radio channel taps, based on a sounding reference signal (SRS) received from a terminal,
determine an average power value of the one or more radio channel taps for each link between a transmission antenna of the terminal in which the SRS is transmitted and a reception antenna of the base station in which the SRS is received,
estimate a variance of interference and noise, based on a demodulation reference signal (DMRS) received from the terminal, and
estimate an effective channel frequency response (CFR) of a physical uplink shared channel (PUSCH), based on the locations of the one or more radio channel taps, the average power value of the one or more radio channel taps, and the variance of the interference and noise.

10. The base station of claim 9, wherein the controller is configured to:
determine a covariance matrix of an effective channel impulse response (CIR), based on assumption that channel power between the transmission antenna and the reception antenna is uniformly allocated to each channel tap,
determine a system matrix, based on the locations of the radio channel taps,
estimate an effective CIR, based on the covariance matrix of the effective CIR, the system matrix, and the variance of the interference and noise, and
estimate an effective CFR of a resource element carrying the PUSCH by performing fast Fourier transform (FFT) on the effective CIR in a frequency domain.

11. The base station of claim 10, wherein the controller is configured to:
stack a matrix picking only a column corresponding to the locations of the one or more radio channel taps obtained from the SRS in a Fourier matrix by a number of observed physical resource blocks (PRBs) to determine the system matrix, and
estimate the effective CIR, based on signals obtained by performing Walsh decovering on a plurality of adjacent reception signals among reception signals of resource elements at which frequency-code division-multiplexed (F-CDM) DMRSs are located.

12. The base station of claim 10, wherein the controller is configured to:
stack a matrix picking only a column corresponding to the locations of the one or more radio channel taps obtained from the SRS in a Fourier matrix by a number of observed physical resource blocks (PRBs),
determine the system matrix using a Walsh code,
estimate the effective CIR, based on a reception signal of a resource element at which the DMRS obtained for each PRB is located according to a number and type of symbols of frequency-code division-multiplexed (F-CDM) DMRSs, and
determine diagonal entries of a diagonal matrix by estimating channel power on each of a plurality of transmission and reception antennas and dividing the channel power by a number of the one or more radio channel taps, or by dividing a sum of the channel power on the plurality of transmission and reception antennas by a sum of the number of the one or more radio channel taps.

13. A terminal for estimating a downlink channel in a wireless communication system, the terminal comprising:
a transceiver configured to transmit and receive a signal; and
a controller configured to:
identify locations of one or more radio channel taps, based on a channel state information reference signal (CSI-RS) received from a base station,
determine an average power value of the one or more radio channel taps for each link between a transmission antenna of the base station in which the CSI-RS is transmitted and a reception antenna of the terminal in which the CSI-RS is received,
estimate a variance of interference and noise, based on a demodulation reference signal (DMRS) received from the base station, and
estimate an effective channel frequency response (CFR) of a physical downlink shared channel (PDSCH), based on the locations of the one or more radio channel taps the average power value of the one or more radio channel taps, and the variance of the interference and noise.

14. The terminal of claim 13, wherein the controller is configured to:
determine a covariance matrix of an effective channel impulse response (CIR), based on assumption that channel power between the transmission antenna and the reception antenna is uniformly allocated to each channel tap,
determine a system matrix, based on the locations of the radio channel taps,
estimate an effective CIR, based on the covariance matrix of the effective CIR, the system matrix, and the variance of the interference and noise, and
estimate an effective CFR of a resource element carrying the PDSCH by performing fast Fourier transform (FFT) on the effective CIR in a frequency domain.

15. The terminal of claim 14, wherein the controller is configured to:
stack a matrix picking only a column corresponding to the locations of the one or more radio channel taps obtained from the CSI-RS in a Fourier matrix by a number of observed physical resource blocks (PRBs) to determine the system matrix, and estimate the effective CIR, based on signals obtained by performing Walsh decovering on a plurality of adjacent reception signals among reception signals of resource elements at which frequency-code division-multiplexed (F-CDM) DMRSs are located, or
stack a matrix picking only a column corresponding to the locations of the one or more radio channel taps obtained from the CSI-RS in a Fourier matrix by the number of observed PRBs, determine the system matrix using a Walsh code, estimate the effective CIR, based on a reception signal of a resource element at which the DMRS obtained for each PRB is located according to a number and type of symbols of the F-CDM DMRSs, and determine diagonal entries of a diagonal matrix by estimating each of channel power on a plurality of transmission and reception antennas and dividing the channel power by a number of the one or more radio channel taps, or by dividing a sum of the channel power on the plurality of transmission and reception antennas by a sum of the number of the one or more radio channel taps.

\* \* \* \* \*